US006567881B1

(12) United States Patent
Mojaver et al.

(10) Patent No.: US 6,567,881 B1
(45) Date of Patent: May 20, 2003

(54) METHOD AND APPARATUS FOR BRIDGING A DIGITAL SIGNAL PROCESSOR TO A PCI BUS

(75) Inventors: Michael Mojaver, San Diego, CA (US); Ray Broemmelsiek, San Diego, CA (US); Andy Sheedy, Stittsville (CA)

(73) Assignee: Tundra Semiconductor Corporation, Ontario (CA)

( * ) Notice: Subject to any disclaimer, the term of this patent is extended or adjusted under 35 U.S.C. 154(b) by 0 days.

(21) Appl. No.: 09/393,455

(22) Filed: Sep. 10, 1999

(30) Foreign Application Priority Data

Sep. 11, 1998 (CA) .............................................. 2247007

(51) Int. Cl.[7] .............................................. G06F 13/00
(52) U.S. Cl. ........................ 710/313; 710/306; 710/110
(58) Field of Search ................................ 710/110, 305, 710/306, 311, 313

(56) References Cited

U.S. PATENT DOCUMENTS

| 5,276,845 | A | | 1/1994 | Takayama |
| 5,396,602 | A | | 3/1995 | Amini et al. |
| 5,434,997 | A | * | 7/1995 | Landry et al. .............. 709/208 |
| 5,511,075 | A | | 4/1996 | Bhasker |
| 5,664,124 | A | | 9/1997 | Katz et al. |
| 5,774,681 | A | | 6/1998 | Kunishige |
| 6,126,601 | A | * | 10/2000 | Gilling ....................... 600/440 |
| 6,170,048 | B1 | * | 1/2001 | Wing So ..................... 712/31 |
| 6,233,643 | B1 | * | 5/2001 | Andrews et al. ............ 370/362 |
| 6,298,370 | B1 | * | 10/2001 | Tang et al. .................. 709/100 |

* cited by examiner

Primary Examiner—Xuan Thai
(74) Attorney, Agent, or Firm—Factor & Partners

(57) ABSTRACT

The present invention provides a digital signal processor (DSP) to peripheral component interconnect (PCI) bus interface/bridging system. The system includes an intermediate bus; a bridge module that is coupled between the PCI bus and the intermediate bus. The bridge module includes a PCI interface and an intermediate bus interface and an IDMA channel coupled between the PCI interface and the intermediate bus interface. A control module is coupled between the bridge module and the DSP circuit, said control module having an intermediate bus control circuit and a DSP control circuit having a slave port controller coupled to the slave port (HPI) of the DSP and a master port controller coupled to the master port (EMIF) of the DSP circuit, whereby the master port continues to transfer data from the DSP circuit to the PCI bus when an additional master circuit is asserted on the PCI bus. The system provides a direct connect solution that also provides arbitration for multiple DSPs.

45 Claims, 23 Drawing Sheets

METHOD AND APPARATUS FOR BRIDGING A DIGITAL SIGNAL PROCESSOR TO A PCI BUS

FIELD OF THE INVENTION

This invention relates to the field of bus bridging systems and more particularly to a method and apparatus for bridging one or multiple digital signal processors with a peripheral component interconnect bus.

BACKGROUND OF THE INVENTION

The use of a Peripheral Component Interconnect (PCI) bus in the embedded systems market is increasing at a rapid pace. PCI originated in the personal computer (PC) industry where it was developed to relieve the input/output (I/O) bottleneck in graphics-oriented personal computer interfaces. However, despite its origins in the PC market, PCI is expanding into industrial and embedded systems applications and has emerged as the de facto local bus standard. This is primarily due to the motivation of designers of high performance embedded systems to leverage component volumes from the PC industry to lower the cost of their products. Large segments of the embedded systems market are rapidly standardizing on PCI, but are facing technical challenges in adapting their processing platforms to PCI architecture.

The ability of digital signal processors (DSPs) to perform high-speed arithmetic, input/output (I/O) and interrupt processing operations has made them popular in communications applications. Currently, DSPs are used in a broad range of embedded consumer and industrial communications products (e.g. cellular phones, modems, call processing systems, wireless base stations, video conferencing systems, routers, etc.). Multiprocessor configurations are also widespread, particularly in communications servers that must support diverse functions and a large number of channels.

The current challenge is to bridge these two merging technologies and provide full function PCI interface solutions for DSPs. In general, a DSP includes a host port interface (HPI) and an external memory interface (EMIF). The HPI is generally a 16 bit slave and the EMIF is generally a 32 bit master (e.g. for the Texas Instruments C6201™ DSP). Traditional solutions involve interfacing directly with the HPI of the DSP. Further, traditional bridging solutions do not provide support for multiple DSPs interfacing with a PCI bus.

SUMMARY OF THE INVENTION object of the present invention is to provide a system for bridging a digital signal processor to a PCI bus.

Another object of the present invention is to provide a system for bridging multiple digital signal processors to a PCI bus.

In accordance with one aspect of the present invention there is provided an apparatus for bridging communications between a first communication endpoint equipped with a two port digital signal processor (DSP) circuit having a DSP master port and a DSP slave port and a second communication endpoint equipped with a peripheral component interconnect (PCI) bus module having a PCI master port and a PCI memory connected to a PCI bus. The apparatus being comprised of an intermediate bus operably connected to the DSP master port and the DSP slave port and a regulating means connecting the PCI bus module to the intermediate bus for regulating access to the intermediate bus and data transfer between the first and second communication endpoints.

In accordance with another aspect of the present invention there is provided a method of carrying out a read transaction over a communications bridge between one communication endpoint equipped with a digital signal processor (DSP) circuit having a DSP master port and a DSP slave port and another communication endpoint equipped with a peripheral component Interconnect (PCI) module having a PCI master port and a PCI slave port, an Intermediate bus being operably connected to the DSP master port, the DSP slave port, the PCI master port, and the PCI slave port. The read method consists of regulating access to the intermediate bus for data transfer between a requesting master port and a requested slave port and transacting date for reading by the requesting master port from the requested slave port.

In accordance with another aspect of the present invention there is provided a method of carrying out a write transaction over a communications bridge between one communication endpoint equipped with a digital signal processor (DSP) circuit having a DSP master port and a DSP slave port and another communication endpoint equipped with a peripheral component interconnect (PCI) module having a PCI master port and a PCI slave port, an intermediate bus being operably connected to the DSP master port, the DSP slave port, the PCI master port, and the PCI slave port. The write method consists of regulating access to the intermediate bus for data transfer between a requesting master port and a requested slave port and transacting date for reading by the requesting master port from the requested slave port.

BRIEF DESCRIPTION OF THE DRAWINGS

The present invention will be described in conjunction with the drawings in which.

DETAILED DESCRIPTION OF THE INVENTION

Figure 1:
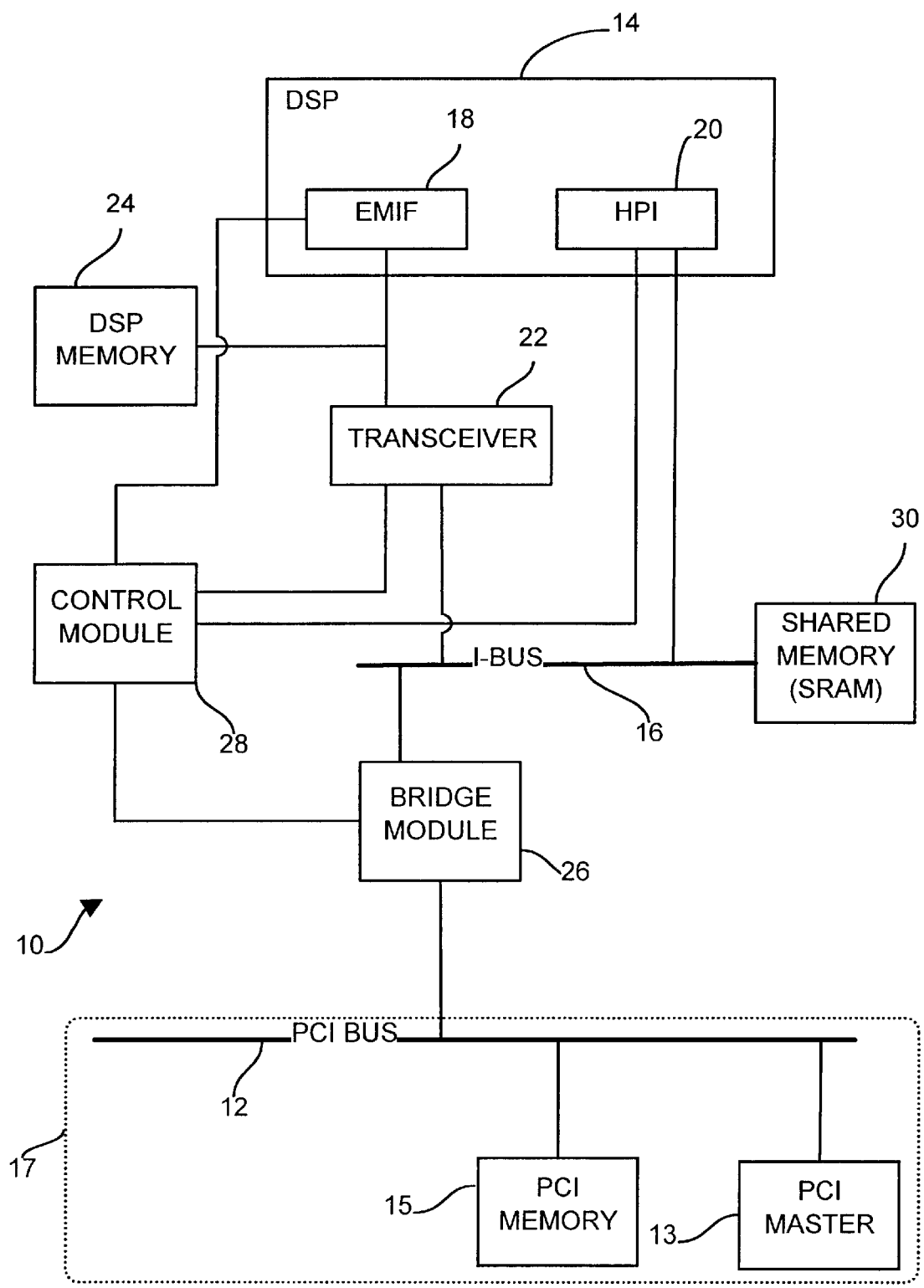
FIG. 1 illustrates a block diagram of a bridging system for a single digital signal processor according to an embodiment of the present invention.

FIG. 1 illustrates a system block diagram of a bridge system 10 of the present invention bridging a PCI bus module 17 to a digital signal processor (DSP) 14 using an intermediate bus (I-BUS) 16. The DSP 14 includes an external memory interface (EMIF) 18 and a host port interface (HPI) 20. The EMIF 18 is connected to a transceiver 22 and to a DSP memory 24. The system 10 includes a bridge module 26, that communicates with the I-BUS 16 and a control module 28 that provides the necessary control and interface functions by polling the EMIF 18, the HPI 20 and the transceiver 22. A shared memory (SRAM) 30 is provided on the I-BUS 16. The PCI bus module 17 includes a PCI bus 12 to which a PCI master port 13 and a PCI memory 15 are connected. The PCI master port 13 and the PCI memory 15 collectively represent any device that communicates directly with the PCI bus 12. Examples of PCI master devices 13 are a host processor bus bridge, a network interface card, and other DSP bus bridges.

Figure 2:
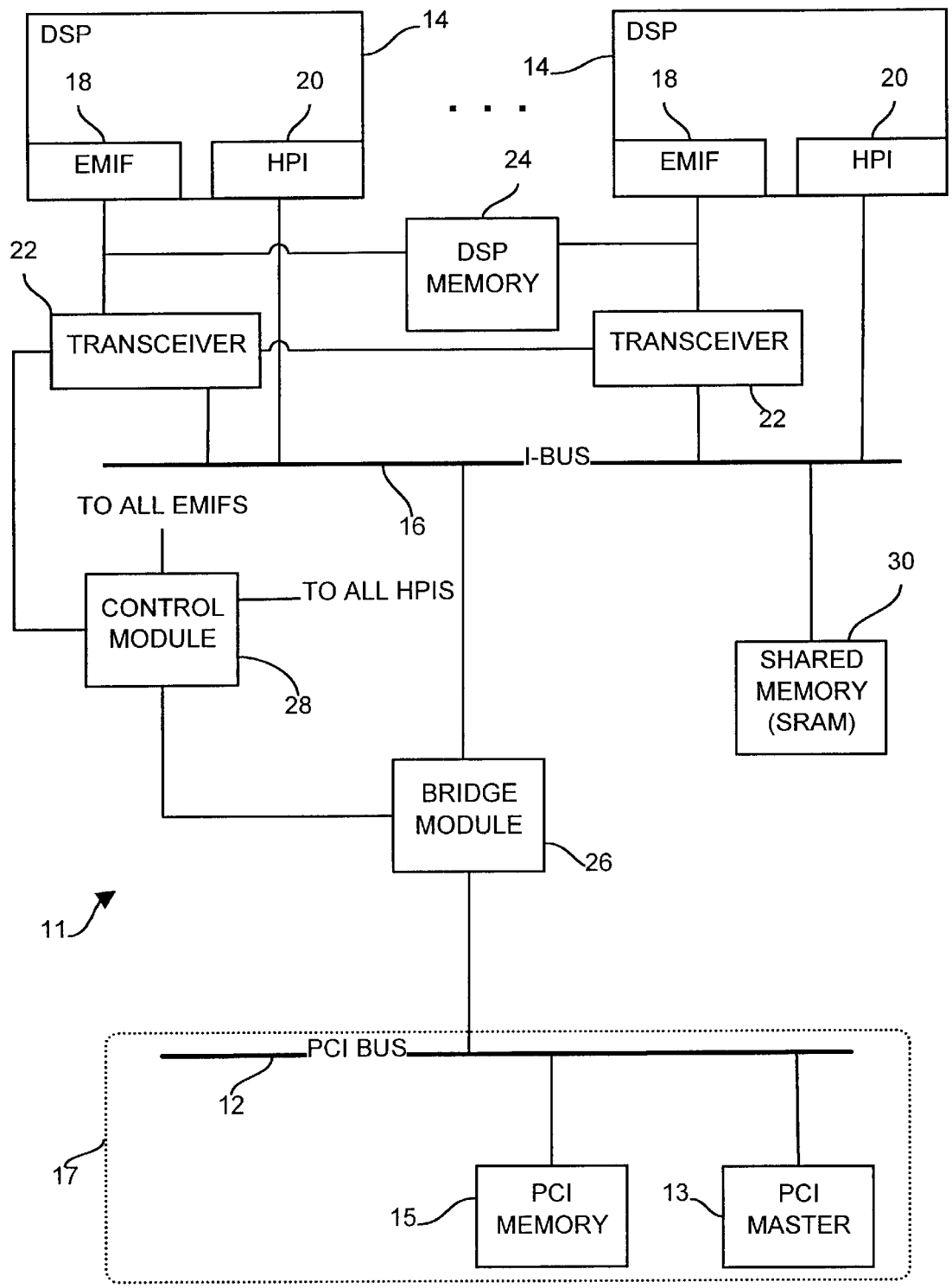
FIG. 2 illustrates a block diagram of a bridging system for multiple digital single processors according to another embodiment of the present invention.

FIG. 2 illustrates a system block diagram of a multiprocessor bridge system 11 according to the present invention. In the system 11, multiple DSPs 14 are connected to the I-BUS 16 and are simultaneously bridged to the PCI bus module 17. The connection topography of each DSP 14 to the I-BUS 16 and the control module 28 are individually identical to that shown in FIG. 1. The connections between the control module 26 and the DSP ports 18 and 20 have been removed for simplicity.

I-BUS

The I-BUS 16 is a native processor bus to the bridge module 26. Each I-BUS 16 transaction involves a master and a slave. The bridge system 10/11 transforms the DSP's HPI 20 and the shared memory 30 into I-BUS slaves, and allows the DSP's EMIF 18 to become an I-BUS master so it can access the shared memory 30 and the PCI bus 12 for DSP 14 initiated transactions. For PCI bus module 17 initiated transactions the bridge module 26 becomes the I-BUS master, described in detail below.

The I-BUS 16 facilitates interprocessor communication in the case where multiple DSPs 14 are found (see FIG. 2) by allowing multiple DSPs 14 to communicate over the I-BUS 16. Additionally, the I-BUS 16 provides access to DSP shared memory 30 as described below.

With the use of the I-BUS 16 to connect to external devices each DSP 14 can run independently until I-BUS 16 access is required. This reduces the dependency on one bus; a problem in direct interfacing. For all DSP 14 initiated transactions local buses may be used, but for all interprocessor and externally initiated transactions it is necessary to use the I-BUS 16

SRAM

The control module 28 facilitates inter-processor communication by providing support for the SRAM 30 on the I-BUS 16. Through arbitration, address mapping and the generation of control signals, the control module 28 allows access to the SRAM 30 by all DSP(s) 14. The SRAM 30 acts as a communication mechanism between all DSPs 14 (wherein access to the SRAM 30 is through the I-BUS 16) by providing a storage location for shared data structures and for message passing. The SRAM 30 is also used as a storage location for information requested by the PCI bus module 17. The SRAM 30 is a typical asynchronous memory resource well known to those skilled in the art.

PCI Bus Module

The PCI bus module 17 is collectively the PCI bus 12 and all devices attached to the PCI bus 12. For description simplification purposes the PCI memory 15 can be viewed as a target (or slave) port of the PCI bus module 17. The PCI master port 13 and the PCI memory 15 are often part of the same device connected to the PCI bus 12.

The PCI bus 12 acts as a foundation for the Microsoft™/Intel™ Plug and Play (PnP) PC architecture. Through the use of configuration registers within any PCI resource, the operating system can reallocate system memory and allow a PC to be dynamically reconfigured. Resource configuration space is divided into three areas: (1) a device-independent header region; (2) a header-type region; and (3) a user-defined region. Further information regarding the PCI architecture can be found in standard PCI bus specifications known to those skilled in the art.

Transceiver

The transceiver 22 acts as an isolator between the I-BUS 16 and the DSP 14. This keeps the electrical activity of the I-BUS 16 isolated from the activity of the EMIF 18. In the case where multiple DSPs 14 access the I-BUS 16, the activity over the I-BUS 16 may not be concerned with all connected DSPs 14. With an open connection between the DSPs 14 and the I-BUS 16 there would invariably be noise received by each DSP 14 due to transactions from other DSPs 14 taking place over the I-BUS 16.

As there is no need to isolate the control module 28 from the EMIF 18, a direct link between these two components exists, This connection allows separate requests to be made by the EMIF 18 to the control module 28 without the intervention of the transceiver 22. The control module 28 and transceiver 22 are connected to allow the control module 28 to open a connection between the EMIF 18 and the I-BUS 16. This allows the EMIF 18 to send a request to the control module 28 to open a connection between the EMIF 18 and the I-BUS 16. Through signals given by the control module 28, the transceiver 22 controls data flow and the direction of the data flow.

DSP Memory

Each DSP 14 may possess its own DSP memory 24 that may be accessed only by that DSP 14 as in FIG. 1. Alternatively, multiple DSPs 14 can share a single DSP memory 24 as in FIG. 2. The DSP memory 24 contains information necessary for booting the DSP 14 via the PCI bus module 17. This DSP memory 24 offers performance advantages for its associated DSP 14 that are beyond what is possible in the SRAM 30.

EMIF-DSP

The EMIF port 18 is the DSP's 14 general purpose external memory interface. The EMIF 18 is the master of the DSP 14 and as such initiates all DSP circuit 14 initiated transactions. The EMIF 18 allows for signal I/O under direct memory access (DMA) while processing continues uninterrupted in the foreground. It may also be used for external I/O functions.

HPI-DSP

The HPI port 20 is a general-purpose I/O port that may be used by another transaction initiating device to access the DSP 14. The HPI 20 is the slave of the DSP14. Data presented at the HPI port 20 is automatically written into internal DSP memory (not shown) without stopping the DSP 14, allowing simultaneous transmission and receipt.

Bridge Module

Figure 3A:
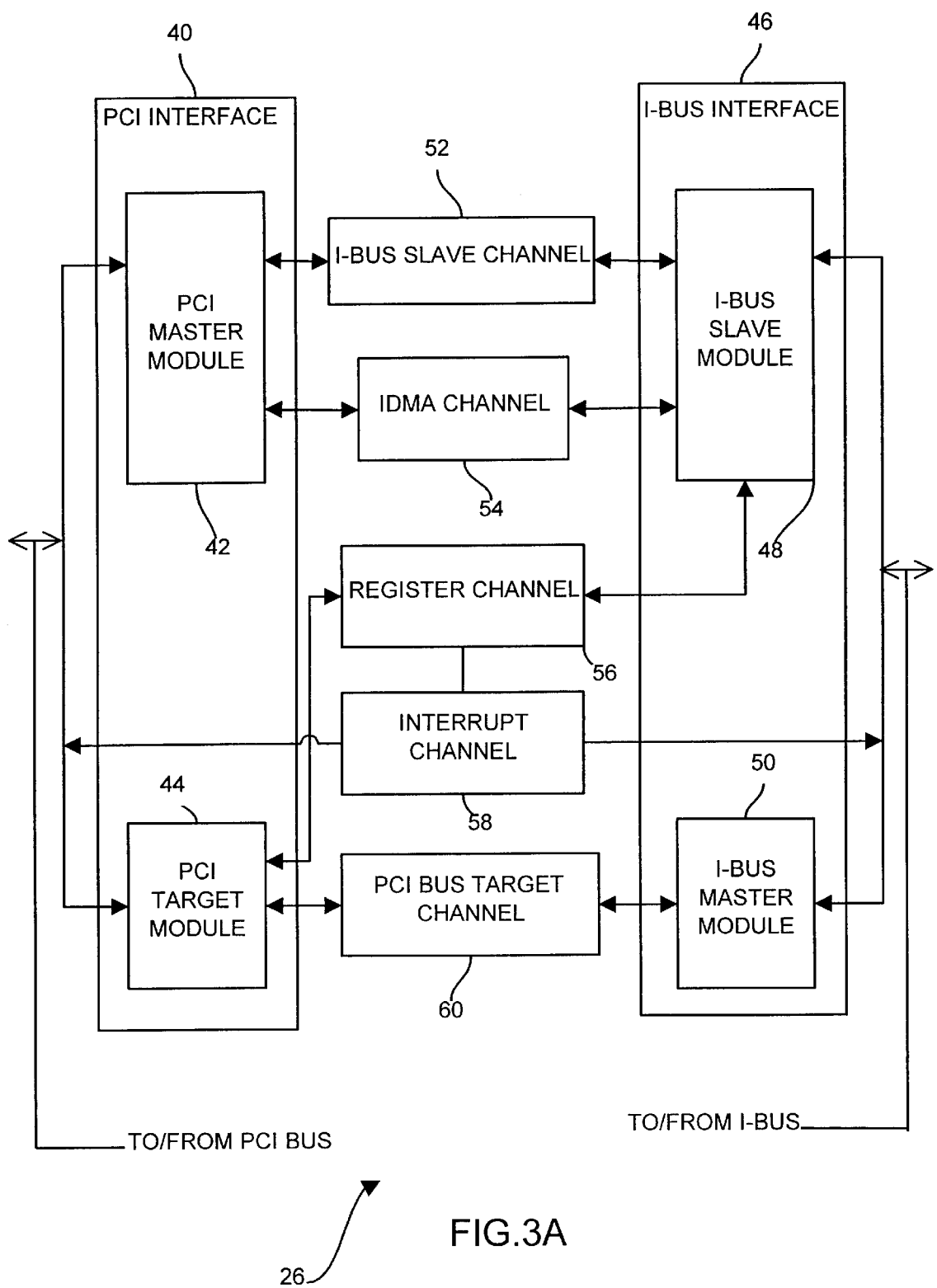
FIG. 3A illustrates a block diagram of the bridge module shown in FIGS. 1 and 2.

FIG. 3A provides a detailed block diagram representation of the bridge module 26. The bridge module 26 includes two interfaces: a PCI interface 40 and an I-BUS interface 46. The bridge module 26 acts as the gateway between the PCI bus module 17 and the I-BUS 16 based on control signals from the control module 28. The PCI interface 40 is the bridge module's 26 connection to the PCI bus module 17 and includes a PCI master module 42 and a PCI target module 44.

The I-BUS interface 46 is an interface that connects the bridge module 26 to the I-BUS 16 and includes an I-BUS slave module 48 and an I-BUS master module 50. The two interfaces 40 and 46 are connected to different functional channels operating in the bridge module 26. The channels include: an I-BUS slave channel 52, an IDMA channel 54, a register channel 56, an interrupt channel 58 and a PCI bus target channel 60 discussed in further detail below.

PCI Master Module

The PCI master module 42 is a PCI standards compliant port with a 32 bit multiplexed address/data bus. The PCI cycles of the bridge module 26 are synchronous, meaning that bus and control input signals are externally synchronized to a PCI clock. The PCI master module 42 is available to either the I-BUS slave channel 52 or the IDMA channel 54. The PCI master module 42 acts as the master of the PCI bus module 17 when the PCI memory 15 Is the slave port of the current transaction making the current transaction a DSP 14 initiated transaction.

PCI Target Module

The PCI target module 44 is a PCI compliant port with a 32 bit multiplexed address/data bus. The PCI cycles are synchronous as discussed in relation to the master module 42. The bridge module 26 requests PCI bus mastership from the control module 28 through its PCI target module 44. The PCI target module 44 is the slave of the PCI bus module 17 when the master of the current transaction is the PCI master 13 the current transaction a PCI bus module 17 initiated transaction.

I-BUS Slave Module

The I-BUS slave module 48 is a non-multiplexed 32 bit address, 32 bit data interface. The I-BUS slave module 48 is capable of receiving and processing requests from an I-BUS master module 50, described in detail below. The I-BUS slave module 48 is the slave when the current transaction is a DSP 14 initiated transaction and the I-BUS master is the DSP EMIF 18.

I-BUS Master Module

The I-BUS master module 50 is a non-multiplexed 32 bit address, 32 bit data interface. The I-BUS master module 50 is capable of initiating and completing requests made to I-BUS slave modules 48. The I-BUS master module 50 is master of the I-BUS 16 for PCI bus module 17 initiated transactions.

I-BUS Slave Channel

The DSP 14 can access the PCI bus module 17 through the bridge module 26 by using the I-BUS slave channel 52 or the IDMA channel 54. The I-BUS slave channel 52 is used in read/write transactions when the I-BUS master wants to access the PCI memory 15 (the target or slave). That is, the I-BUS slave channel 52 is used for DSP circuit 14 initiated transactions. The IDMA channel 54 is used for high speed data transfer when the I-BUS 16 accesses the PCI memory 15.

A slave image is defined as a set of parameters in the I-BUS slave channel 52 that control transfers from the I-BUS 16 to the PCI bus module 17. Similarly, a target image is provided in the PCI bus target channel 60. In an illustrative embodiment, two slave images are provided in the I-BUS slave channel 52 to enable quick access to different PCI addresses from the I-BUS 16. The two slave images can be completely independent from one another. For example, in one configuration, a slave image 0 can be used to access a hard-drive using memory in PCI memory 15 and a slave image 1 would be available to access a different device with its own memory size.

PCI Bus Target Channel

The PCI master port 13 can access the I-BUS slave 48 through the bridge module 26 by using the PCI bus target channel 60. The operation of the PCI bus target channel 60 is generally illustrated in the timing drawings described herein below involving a path of a transaction from the PCI bus 12 to the I-BUS 16 that involves the following main steps: (1) address phase, (2) data transfer, (3) I-BUS arbitration, and (4) termination.

IDMA Channel

Direct memory access transactions are initiated on the I-BUS 16. The IDMA channel 54 is used for high speed access of the PCI memory 15 by the EMIF 18. The I-BUS slave module 48 accepts IDMA read and write transfers.

Register Channel

The register channel 56 is used to program PCI settings and to define operating parameters of the bridge module 26. Registers in the register channel 56 can be accessed from either the PCI bus module 17 or the I-BUS 16. Due to this dual access support, an internal pointer selects which bus can access the registers. Default ownership of the register channel 56 is granted to the PCI target module 44. When ownership of the register channel 56 is granted to the I-BUS slave module 48, register accesses from the PCI bus module 17 are retried.

Interrupt Channel

The interrupt channel 58 is used to support certain hardware and software events that trigger interrupts on the I-BUS 16 and the PCI bus 12. A hardware interrupt involves a signal on one interface triggering an interrupt on an opposite interface. A software triggered interrupt is generated by the bridge module 26 based on internal events.

Figure 3B:
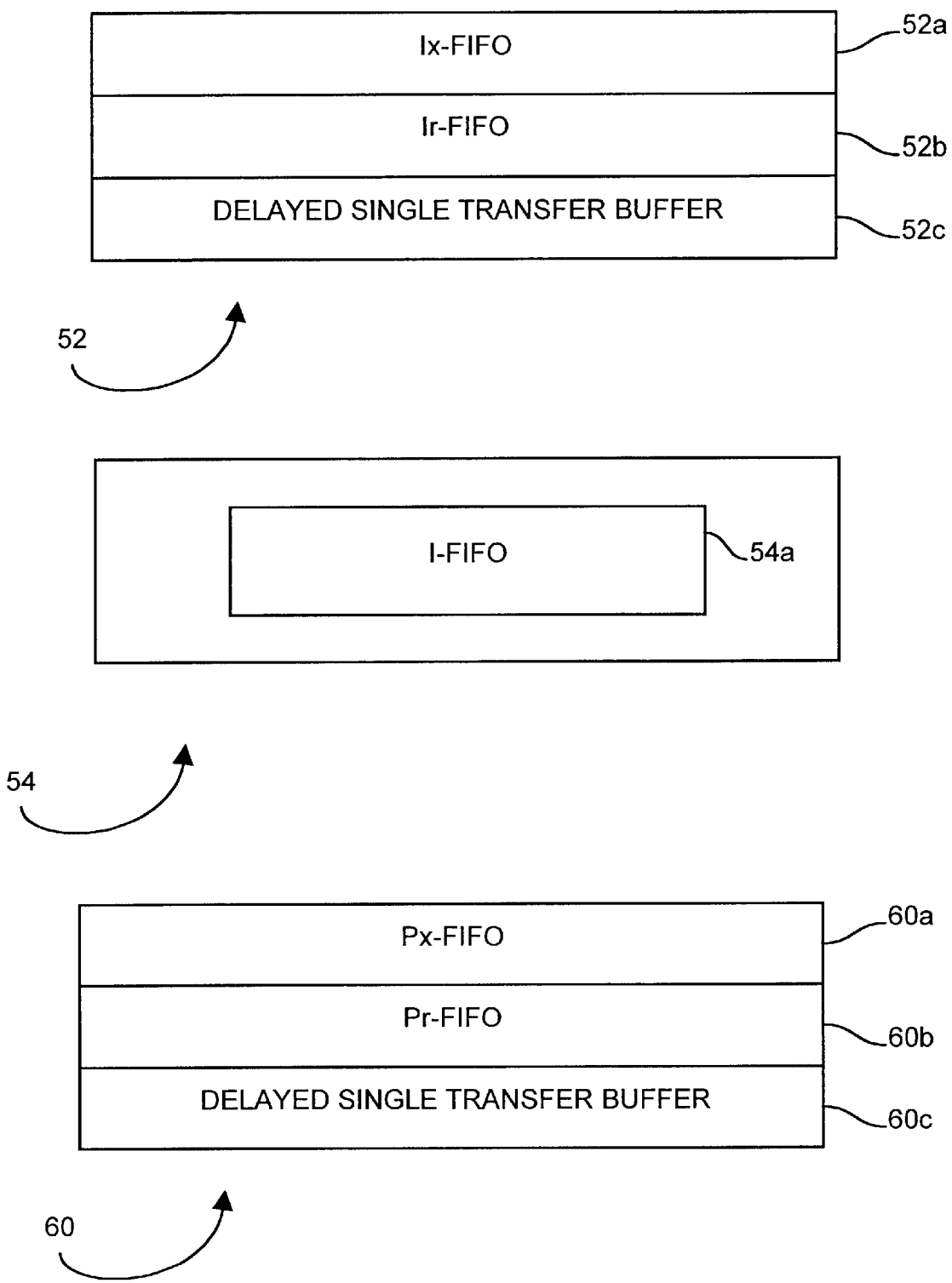
FIG. 3B illustrates block diagrams of the I-BUS slave channel, the IDMA channel and the PCI bus target channel shown in FIG. 3A.

Further detailed block diagrams of channel 52, 54 and 60 are shown in FIG. 3B. The I-BUS slave channel 52 includes a first-in-first-out write buffer 52a(Ix-FIFO) for posted writes; a first-in-first-out read buffer 52b(Ir-FIFO) for pre-fetched reads; and a delayed single transfer buffer 52c.

The IDMA channel 54 includes a first-in-first-out buffer 54a for posted writes and pre-fetched reads. The PCI bus target channel 60 includes a first-in-first-out write buffer 60a (Px-FIFO) for posted writes; a first-in-first-out read buffer 60b (Pr-FIFO) for pre-fetched reads; and a delayed single transfer buffer 60c.

The delayed single transfer buffers 52c/60c are used for storing a single data entry and an associated address entry.

These delayed single transfer buffers 52c/60c are used to improve write performance and read performance of transactions between the PCI bus module 17 and the I-BUS 16.

Control Module

Figure 4A:
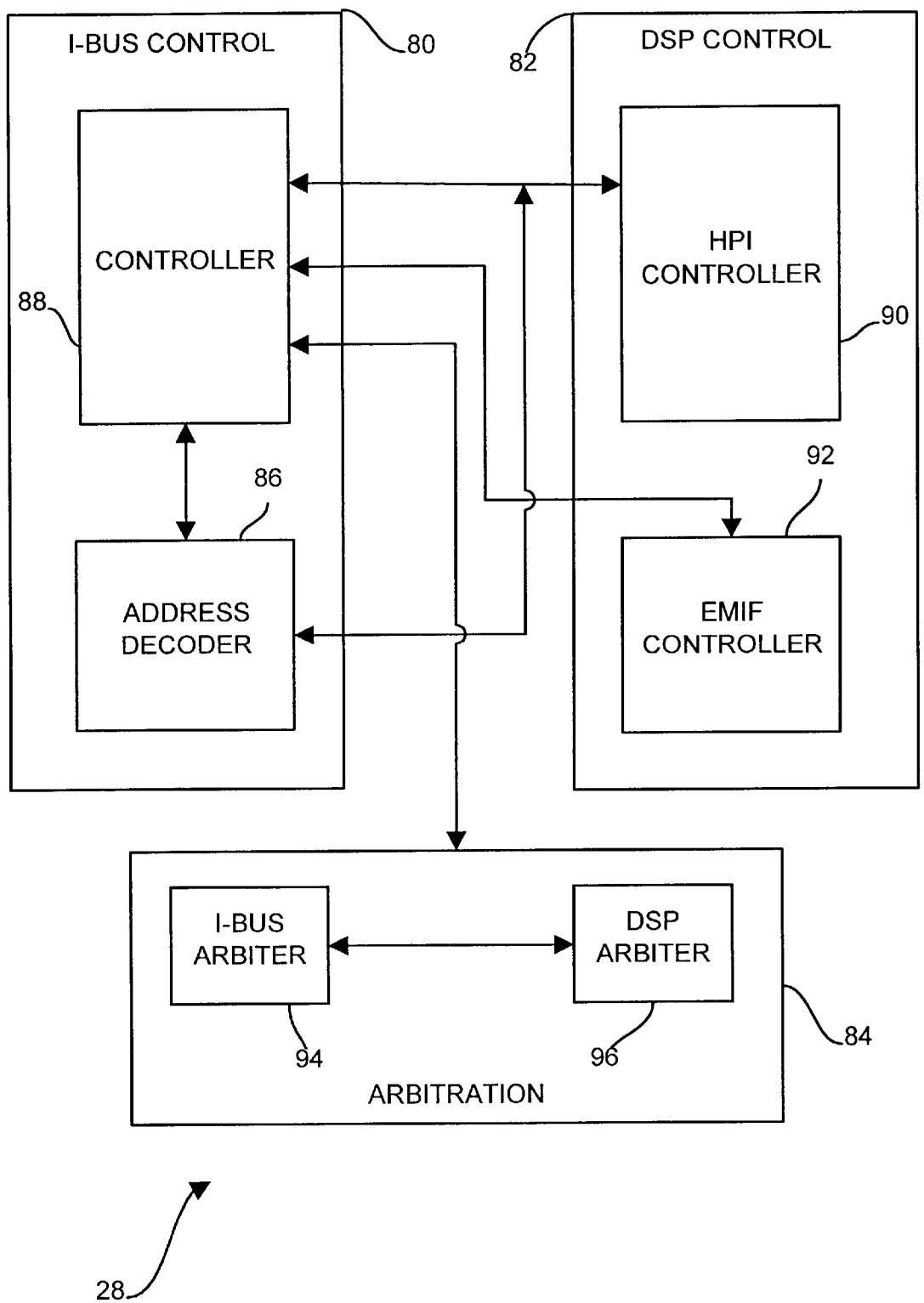
FIG. 4A illustrates a block diagram of the control module shown in FIGS. 1 and 2 according to an embodiment of the present invention.
Figure 4B:
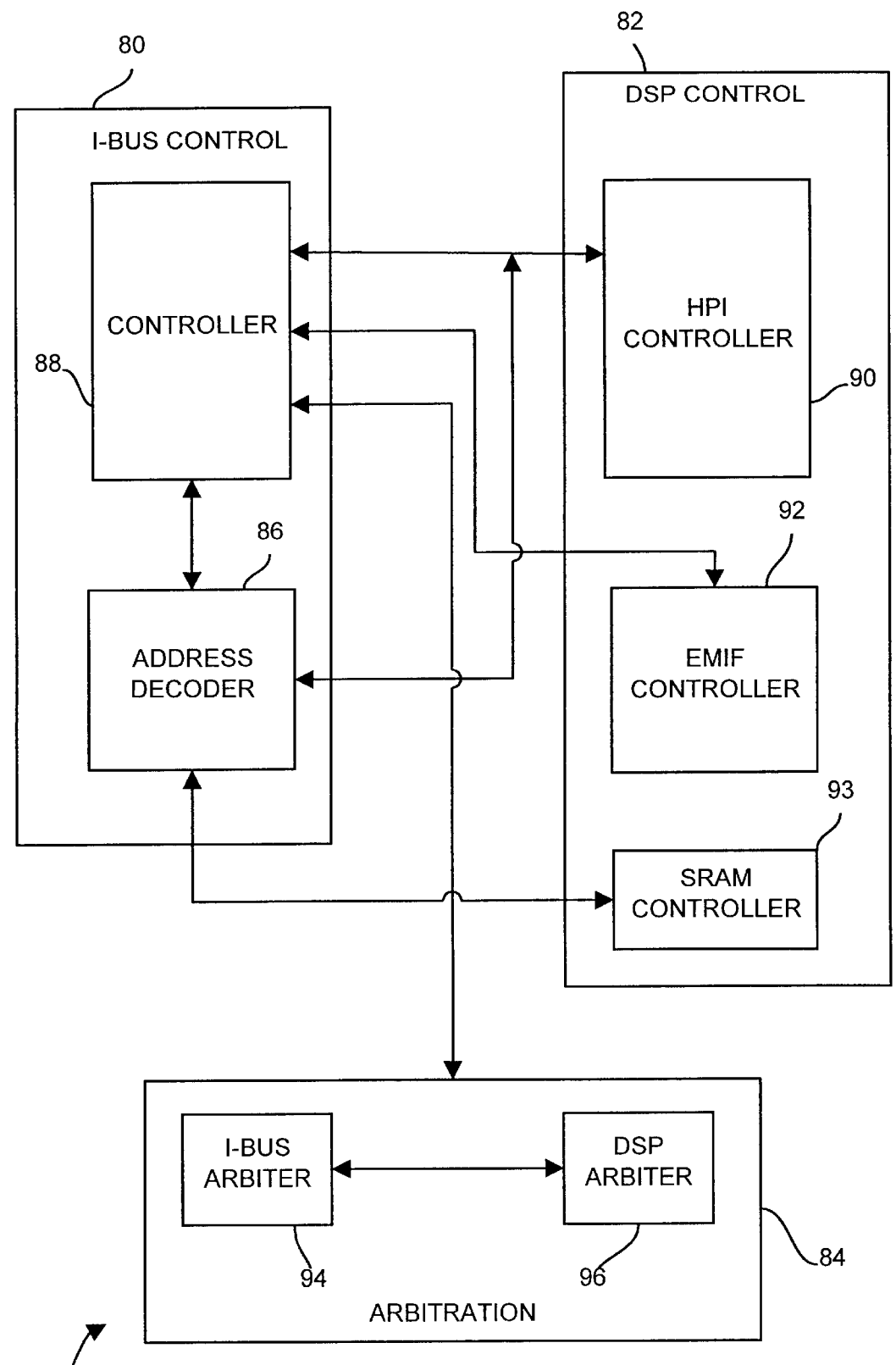
FIG. 4B illustrates a block diagram of the control module shown in FIGS. 1 and 2 according to another embodiment of the present invention.

FIGS. 4A and 4B provide detailed block diagram representations of two embodiments of the control module 28/28' respectively (collectively referenced by numeral 28). The control module 28 coordinates signaling and arbitration of the bridge module 26 and the DSP 14 to provide PCI protocol translation. The control module 28 includes an I-BUS control section 80, a DSP control section 82 and an arbitration section 84. The DSP control section 82 includes an HPI controller 90 and an EMIF controller 92 (in the embodiment of FIG. 4A). The arbitration section 84 includes an I-BUS arbiter 94 and a DSP arbiter 96.

I-BUS Control Section

The I-BUS control section 80 includes an address decoder 86 and a controller 88. The selection of I-BUS slaves in the bridge module 26 is memory mapped in the address decoder 86. The address decoder 86 provides the memory mapping that controls the generation of required chip select signals. The address decoder 86 determines which device on the I-BUS 16 is to be selected for the current transaction. It does so by decoding the address lines of the I-BUS 16.

If an address is decoded as a register access, the control module 28 asserts, through the I-BUS control section 80, a register chip select signal (CSREG). If an address is decoded as an EMIF-PCI access, the control module 28 asserts, through the I-BUS control section 80, a PCI chip-select signal (CSPCI) and one of two bridge slave images of the channel in use is selected. The bridge slave images can be those of the I-BUS slave channel 52, the register channel 56 or the IDMA channel 54.

The control module 28 asserts an image select signal (IMSEL) to determine which of the two bridge slave images is used. If the IMSEL signal is at a logic 0, I-BUS slave image 0 is selected. If the IMSEL signal is at a logic 1, I-BUS slave image 1 is selected.

If an address is decoded as a direct memory access (IDMA) and the bridge module 26 asserts an IDMA request signal (DREQ) then the control module 28 asserts an IDMA acknowledge signal (DACK). If an address is decoded as an SRAM access from either the bridge module 26 or the DSP 14 then the control module 28 asserts an SRAM chip select signal (CS).

If an address is decoded as a PCI-HPI register access, then the control module 28 asserts an HPI chip select for DSP signal (HCS) and an HPI control signal (HCNTL) to determine which DSP's 14 host port register 20 will be accessed.

Details of the signals referenced above are provided in Table A1 at the end of the disclosure portion of the application.

The controller 88 is involved in a series of the different transaction types on the I-BUS 16. A sample list of I-BUS 16 transactions is provided in Table B1.

TABLE B1

| MASTER | TARGET | TRANSACTION TYPE | I-BUS PROTOCOL |
| --- | --- | --- | --- |
| DSP 14 | Bridge module 26 | Bridge module Register access | I-BUS master |
| DSP 14 | Bridge module 26 | EMIF PCI access | I-BUS master |
| DSP 14 | Bridge module 26 | IDMA access | IDMA master |
| DSP 14 | Shared memory | Shared memory | DSP 14 memory |

TABLE B1-continued

| MASTER | TARGET | TRANSACTION TYPE | I-BUS PROTOCOL |
| --- | --- | --- | --- |
| Bridge module 26 | (SRAM) 30 SRAM 30 | access Shared memory access | Bridge module 26 memory |
| Bridge module 26 | HPI 20 of DSP 14 | PCI HPI access | I-BUS slave |

One of the general tasks the controller 88 performs is handshaking on the I-BUS 16 for both DSP(s) 14 and bridge module 26 transactions. In the I-BUS slave mode, the controller 88 terminates bridge module 26 master channel transactions targeted at the DSP's HPI 20 or the shared memory 30. In master mode, the controller 88 generates arbitration and control signals on behalf of the DSP's EMIF 18 for accessing the bridge module 26. For the shared memory 30 access, the controller 88 also generates SRAM cycles for both the DSP(s) 14 and the bridge module 26.

As detailed in Table B1 above, the control module 28 supports five different protocols on the I-BUS 16 for reads and writes: I-BUS master, I-BUS slave, IDMA master, DSP(s) memory, and bridge module memory, I-BUS mastering supports the following DSP(s) 14 transactions: bridge module 26 register access and PCI access via the I-BUS slave channel 52 of the bridge module 26 (i.e. EMIF-PCI access). Two conditions qualify a transaction as an I-BUS master cycle. First, the I-BUS arbiter 94 grants the DSP(s) 14 the I-BUS 16. Second, the DSP(s) 14 is engaged into an I-BUS access cycle involving the register channel 56 of the bridge module 26 as decoded by the address decoder 86. With these two stipulations met, the DSP 14 can then perform read or writes to either the register channel 56 of the bridge module 26 or the PCI bus module 17.

The I-BUS slave protocol of the control module 28 supports access by the bridge module 26 to the HPI 20 of the DSP 14. An I-BUS slave cycle occurs once the bridge module 26 is granted the I-BUS 16 by the I-BUS arbiter 94 and the I-BUS 16 is engaged into a HPI I-BUS access cycle as indicated by the address decoder 86. The bridge module 26 then asserts a bus busy (BB) signal and the controller 88 engages the HPI controller 90.

For each slave cycle, the control module 28 provides a termination code depending on the state of the HPI transaction returned by the HPI controller 90, and the HPI 20 sources or sinks data if ready. If the termination code is RETRY then the bridge module 26 will cause the entire sequence to repeat otherwise the controller 88 will return to an IDLE state.

IDMA mastering supports high speed transfers with the DSP(s) 14 utilizing the IDMA channel 54 of the bridge module 26. Two conditions qualify a transaction as an I-BUS master cycle. First, the DSP(s) 14 is granted the I-BUS 16 by the I-BUS arbiter 94. Second, the DSP(s) 14 is engaged into an IDMA access cycle as indicated by the address decoder 86. Once these two qualifications are met, the control module 28 asserts control signals to initiate bridge module 26 IDMA access. The bridge module 26 will sink or source data and send a termination to the EMIF controller 92 for processing.

The DSP(s) 14 shared memory access is aligned, for example to 32 bits wide, read/write access to the shared memory 30. The control module 28 provides the required shared memory control signals: chip select (CS), read strobe (RD), and write strobe (WR). In order for a DSP(s) 14 memory cycle to occur, the DSP(s) 14 must be granted the I-BUS 16 by the I-BUS arbiter 94 and must also become engaged into an I-BUS access cycle involving the shared memory 30 as decoded by the address decoder 86. During DSP 14 shared memory access cycles, the control module 28 polls the RD or WR signal based on signals sampled by the EMIF controller 92.

The bridge module 26 shared memory access is aligned, for example to 32 bits wide, read/write access to the shared memory 30. Two conditions qualify a transaction as an I-BUS master cycle. First, the bridge module 26 must be granted the I-BUS 16 by the I-BUS arbiter 94. Second, the I-BUS access cycle must involve the shared memory 30 as decoded by the address decoder 86. For these transactions, the control module 28 provides the CS and RD/WR strobes as discussed above.

DSP Control Section

The DSP control section 82 includes an HPI controller 90 and an EMIF controller 92. The control module 28' (of FIG. 4B) also includes an SRAM controller 93 according to an alternative embodiment of the present invention. The host port interface 20 of the DSP 14 is a parallel port through which the PCI master port 13 can access registers of the HPI 20. This type of transaction is termed a PCI-HPI access. The data path for PCI-HPI access includes the PCI bus target channel 60 of the bridge module 26. The PCI bus target channel 60 provides two programmable target images at the PCI interface 40. Either target image can be mapped to access the HPI 20 of the DSP 14 and both can execute delayed or posted transactions.

The HPI controller 90 of the DSP control section 82 facilitates PCI-HPI access by interpreting the transaction signals from the bridge module 26 and controlling the transaction signals on the HPI 20. The HPI controller 90 asserts HPI chip select (HCS) and HPI control select (HCNTL) signals to direct a transaction to one of three registers in the HPI 20 of the DSP 14; (1) HPI address register (HPIA), (2) HPI data register (HPID), and (3) HPI control register (HPIC).

The HPI controller 90 drives an HPI data strobe (HDS) and an HPI read/write select (HR_W) signal to initiate the transaction on the HPI 20. The HPI controller 90 also controls the transfer of data based on an HPI ready (HRDY) signal. If the HPI controller 90 samples the HRDY signal high, no data can be transferred. The control module 28 will generate retries on the I-BUS 16 until the HPI controller 90 samples the HRDY signal low allowing the data transfer to proceed.

PCI-HPI accesses compliment multiprocessor system requirements such as the system 11 shown in FIG. 2. The PCI master port 13 can access internal or I/O memory of the DSP 14, as well as reading or writing to the registers (HPIA, HPID, and HPIC) of the HPI 20. Along with register access, the PCI master port 13 can also interrupt the DSP 14 by writing to the HPIC register.

EMIF Controller

The external memory interface (EMIF) controller 92 supports DSP 14 access to the I-BUS 16 allowing the DSP 14 to master the I-BUS 16. As an I-BUS master, the EMIF 18 of the DSP 14 performs four different types of transactions: (1) bridge register access; (2) EMIF-PCI access; (3) IDMA access; and (4) global shared memory access to the shared memory 30.

The EMIF controller 92 manages transaction signals between the EMIF 18 of the DSP 14 and the bridge module 26. This allows the DSP 14 to perform read/write transactions on the PCI bus module 17 via the slave channel 52 of the bridge module 26.

For IDMA access, the EMIF controller 92 works in conjunction with a DMA controller (not shown) in the DSP 14 in order to manage transaction signals for transfers between the EMIF 18 of the DSP 14 and the IDMA channel 54 of the bridge module 26.

To access the shared memory 30, the EMIF controller 92 manages the transaction signals between the EMIF 18 of the DSP 14 and the memory 30 allowing the DSP 14 to read/write directly to the memory 30.

For all transactions initiated by the EMIF 18 of the DSP 14, the EMIF controller 92 of the control module 28 interprets the transaction signals from the DSP 14 and manages the transaction signals on the I-BUS 16. The DSP 14 indicates it is ready to perform transactions by asserting a chip enable (CE) signal. The EMIF controller 92 samples a byte enable (BE) signal and translates the signal into an I-BUS 16 byte enable signal. If the EMIF 18 initiates a read, the EMIF controller 92 samples an asynchronous memory output enable (AOE) signal and an asynchronous memory read (ARE) strobe.

If the EMIF 18 initiates a write, the EMIF controller 92 samples an asynchronous memory write (AWE) strobe. In both transactions, the EMIF controller 92 drives a asynchronous memory write (ARDY) strobe to regulate data flow. In particular, the EMIF controller 92 asserts ARDY low to wait state the asynchronous interface and the transaction may resume once ARDY is asserted high.

As summarized in Table A1, ARDY is an active high asynchronous ready input used to control data flow between the EMIF 18 and the I-BUS 16. The ARDY signal commits the EMIF 18 until either a transaction completes or fails on the I-BUS 16. A detailed summary of ARDY behavior is provided in Table B2.

TABLE B2

| TRANSACTION | RETRY | NORMAL | ERROR |
|---|---|---|---|
| register read/write (control module 28) | ARDY = 0 | ARDY = 1 | ARDY = 1 |
| read/write (EMIF 18-PCI 12) | ARDY = 0 | ARDY = 1 | ARDY = 1 EINT = 0 |
| read/write (IDMA) | DREQ = 1 ARDY = 0 | DREQ = 0 ARDY = 1 | ARDY = 1 EINT = 0 |
| read/write (SRAM 30) | N/A | ARDY = 1 | N/A |

Interfacing with the EMIF allows for improved speed (bytes/second) as well as a reduction in latency (clocks/transaction completion).

SRAM Controller

As discussed above, the control module 28' of FIG. 4B includes the SRAM controller 93. During DSP shared memory access cycles, the SRAM controller 93 strobes the RD or WR signal based on signals sampled by the EMIF controller 92. The SRAM controller 93 facilitates access to the SRAM 30 by interpreting the transaction signals from the bridge module 26 and controlling the signals on the SRAM 30. The SRAM controller 93 interfaces with the address decoder so that if the SRAM 30 is the selected device the address decoder can notify the SRAM 30 through the SRAM controller 93.

Arbitration Section

The arbitration section 84 facilitates I-BUS 16 access arbitration for PCI masters as well as for the DSPs 14 in the multiple processor system 11 of FIG. 2. Arbitration is a round-robin process for the DSPs 14 and provides priority for bridge module 26 accesses to the I-BUS 16. The arbitration section 84 points to the DSPs 14 to minimize EMIF 18 access latency.

When the DSP 14 initiates a transaction to the I-BUS 16 via the EMIF 18, the EMIF 18 may not be used by the DSP 14 until that transaction is complete. Therefore, in order to minimize EMIF 18 to I-BUS 16 access latency in a multiple DSP configuration (FIG. 2), it is the arbitration section 84 that must efficiently grant I-BUS 16 access. So the arbitration section 84 minimizes the amount of time the EMIF 18 waits for access to the I-BUS 16 as another transaction is taking place.

The arbitration section 84 also controls the direction of data flow and activity of the transceivers 22 located between the EMIFs 18 of the DSPs 14 and the I-BUS 16.

When a DSP read cycle is executed, the transceiver 22 drives the I-BUS 16 data bus onto the EMIF 18 data bus. When the DSP 14 performs a write cycle, to the I-BUS 16, the transceiver 22 drives data from the EMIF 18 to the I-BUS 16.

I-BUS Arbiter

Figure 5:
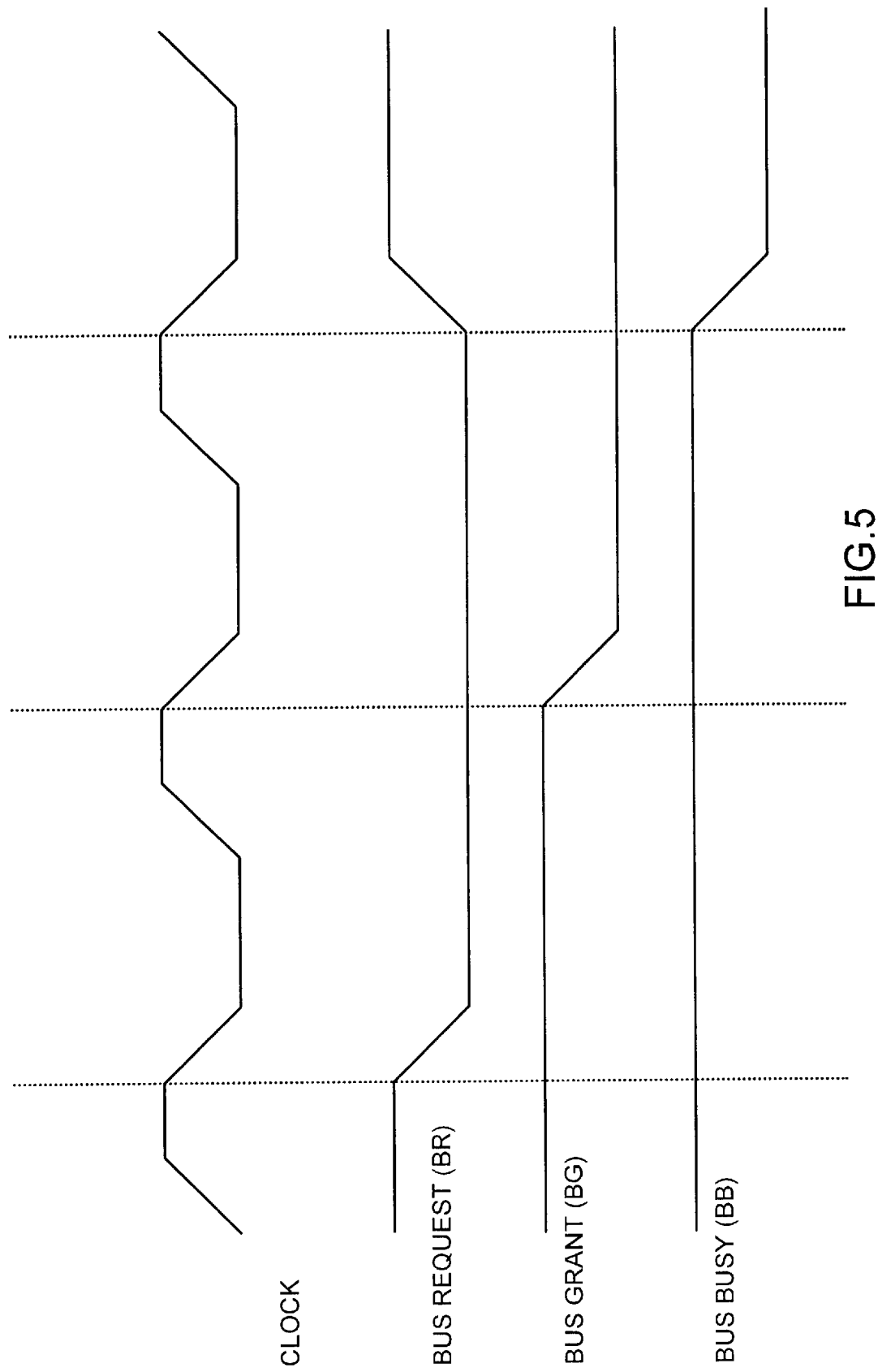
FIG. 5 illustrates a timing diagram of various signals used to arbitrate multiple DSPs access to the I-BUS shown in FIG. 2.

All bridge module target channel accesses begin with the bridge module 26 requesting access to the I-BUS 16 from the control module 28. Both the control module 28 and the bridge module 26 take part in I-BUS arbitration using a three wire handshake triggered by a clock signal, as illustrated in FIG. 5. The bridge module 26 begins by asserting a bus request (BR) signal. The control module 28 asserts a bus grant (BG) signal and negates a bus busy (BB) signal. When the bridge module 26 samples BG asserted and BB negated, the bridge module 26 asserts BB and negates its BR. The BR, BG and BB signals are all synchronized to the clock.

If the control module 28 asserts the bus busy signal in response to the bus request signal from the bridge module 26, then the bridge module 26 will be retried. The bus busy signal indicates that an active bus master is preparing to use or continuing to use the I-BUS 16. The current transaction will have to complete before the bridge module 26 is granted access to the I-BUS 16 by the control module 28. Upon being granted access to the I-BUS 16, the address decoder 86 of the control module 28 decodes the I-BUS 16 address to determine which DSP HPI 20 or SRAM 30 location is to be accessed.

DSP Arbiter

Each of the DSPs 14 (of system 11 in FIG. 2) interfaced to the control module 28 can request access to the I-BUS 16 via the DSP arbiter 96. The DSP arbiter 96 provides round-robin access to each of the DSPs 14. The requested DSP 14 asserts an I-BUS request (REQ) signal to the control module 28 to acquire access to the I-BUS 16. The I-BUS 16 is available when an I-BUS grant (GNT) signal is asserted by the DSP 14.

Pending I-BUS 16 requests are re-evaluated at the following positive edge of the clock signal after the DSP 14 of the last granted request is released.

Interrupt Generation

There are two sources of interrupts to the DSP 14: (1) internal bridge module 26 interrupts and (2) I-BUS 16 errors. Interrupts generated by the bridge module 26 are available on a bridge module interrupt (INT) signal and can be enabled for various internal and external events. The bridge module INT signal is reset using a bridge module ISR register on the receipt of each interrupt.

Errors encountered on the I-BUS 16 are signaled by the control module 28. The DSP 14 receives an I-BUS error interrupt (EINT) under one of the following conditions: (1) the PCI bus 12 encounters delayed read or write results in master or target; (2) the bridge module 26 register access that generates PCI configuration causing an abort; and (3) accessing a reserved location in a memory map of the address decoder 86.

Transactions

Figure 6A:
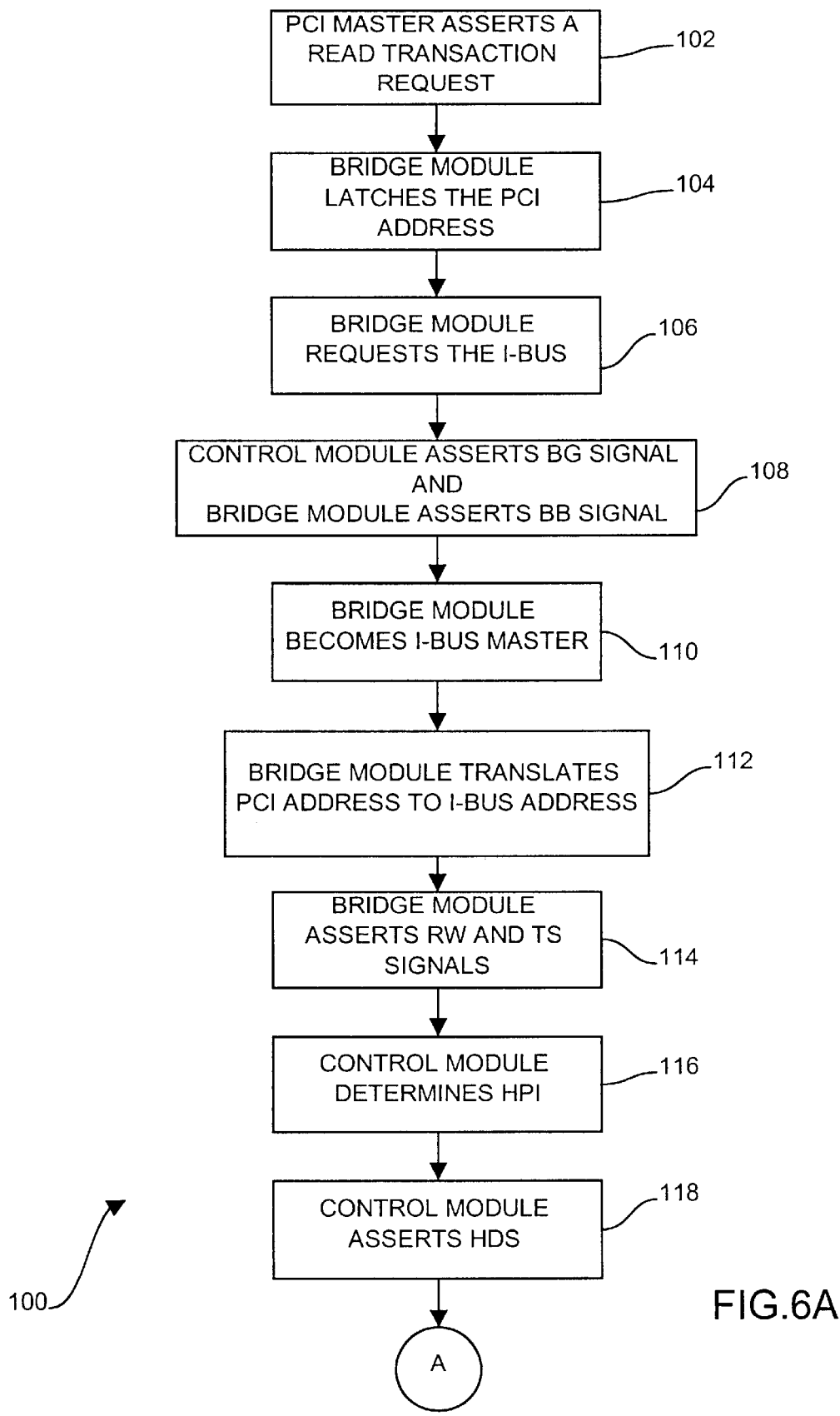
FIGS. 6A–6B illustrate a flow chart of a PCI-HPI read transaction according to the present invention.
Figure 6B:
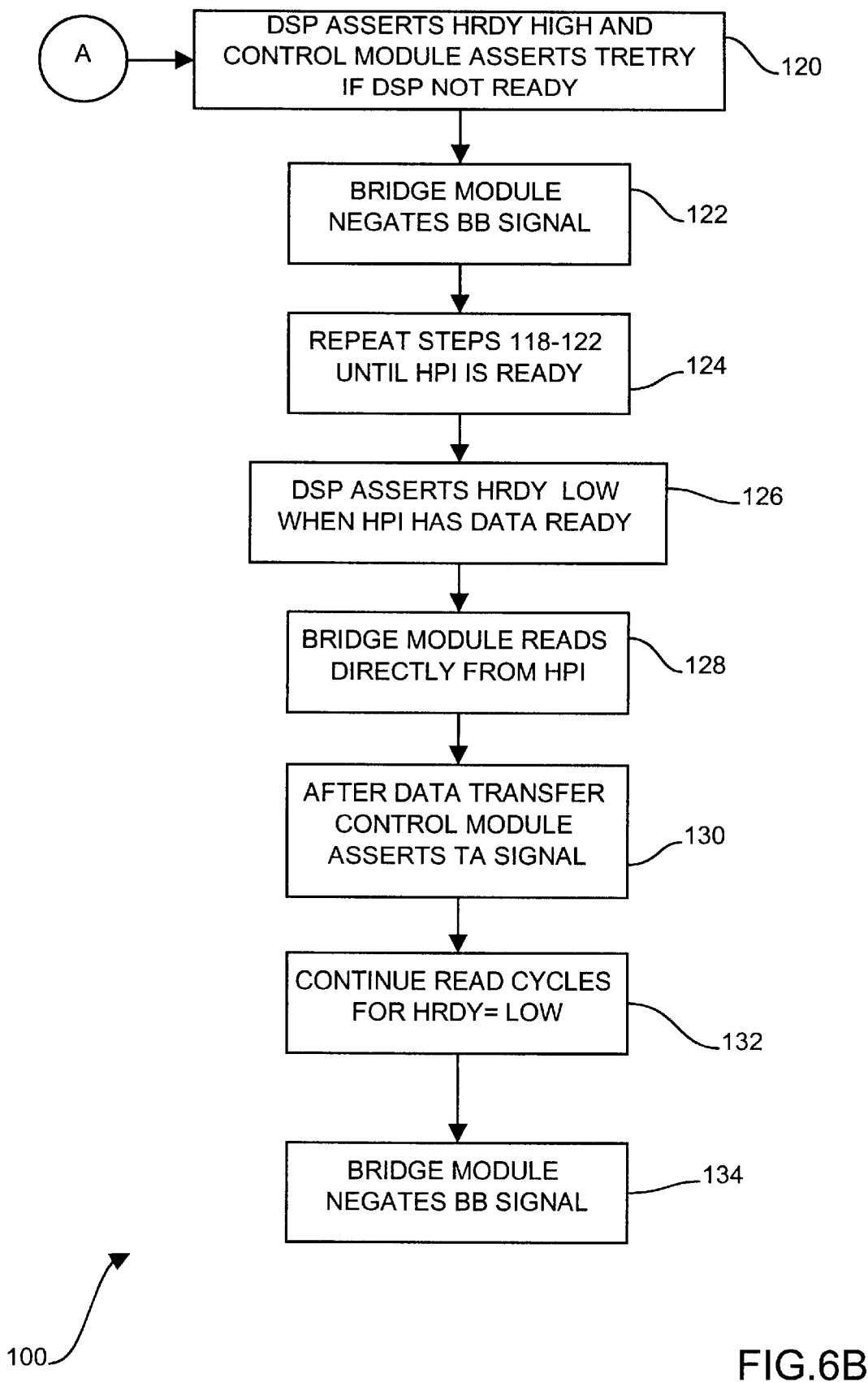

A PCI-HPI read transaction 100 is illustrated in the flow chart of FIGS. 6A–6B. The transaction 100 consists of the PCI master port 13 performing a PCI read from an HPI register in the HPI 20 of the DSP 14. The specific depiction of a PCI-HPI read transaction 100 in FIGS. 6A and 6B is exemplary and all read transactions occur in a similar manner.

The PCI master port 13, having a specific address, asserts a read transaction request on the PCI bus 12 at step 102. The bridge module 26 recognizes the address of the PCI master port 13 and latches the address of the PCI master port 13 at step 104.

The bridge module 26 requests the I-BUS 16 by asserting a bus request (BR) signal at step 106. The control module 28 asserts a bus grant (BG) signal and the bridge module 26 asserts a bus busy (BB) signal at step 108 in response to the bus request signal issued by the bridge module 26 at step 106.

The bridge module 26 then becomes an I-BUS master and initiates a read on the I-BUS 16 at step 110. The bridge module 26 translates the address of the PCI master port 13 into an I-BUS address using PCI target image settings and properties stored in the PCI target module 44 of the bridge module 26 at step 112. The bridge module 26 asserts a read/write (RW) signal and a transaction start (TS) signal to the control module 28 at step 114.

The control module 28 determines, based on the I-BUS address determined at step 112, which HPI 20 the request is for and asserts an HPI chip select (HCS) signal, a register selector (HCNTRL) and a read request (HR_W) signal at step 116.

The control module 28 asserts an HPI data strobe (HDS) at step 118 to indicate to the DSP 14 that there is an access/read request. If the DSP 14 does not have the data ready to respond to the read request, the DSP 14 asserts the HPI ready (HRDY) signal high to the control module 28 and the control module 28 in-turn asserts a retry (TRETRY) signal on the I-BUS 16 at step 120. The bridge module 26 then negates the bus busy (BB) signal at step 122.

The bridge module 26 and the control module 28 repeat steps 118–122 at step 124 until the HPI 20 of the DSP 14 has the data ready to answer the read request. When the HPI 20 of the DSP 14 has the data available, the DSP 14 asserts the HPI ready (HRDY) signal low at step 126.

When the bridge module 26 asserts a transaction start (TS) signal, the DSP 14 drives the HPI data strobe and the data is read by the bridge module 26 directly from the HPI 20 of the DSP 14 at step 128. After the data transfer, the control module 28 asserts a transaction acknowledge (TA) signal at step 130 to signal to the bridge module 26 the end of the cycle. Read cycles occur at step 132 as long as the HRDY signal is low until the entirety of the read data is transferred.

When the transaction is complete, the bridge module 26 negates the BB signal to terminate the transaction at stop 134.

When the PCI master port 13 retries the same transaction—qualified by the latched information—it is provided with the data from the bridge module 26 and the transaction terminates normally on the PCI bus 12.

Figure 7A:
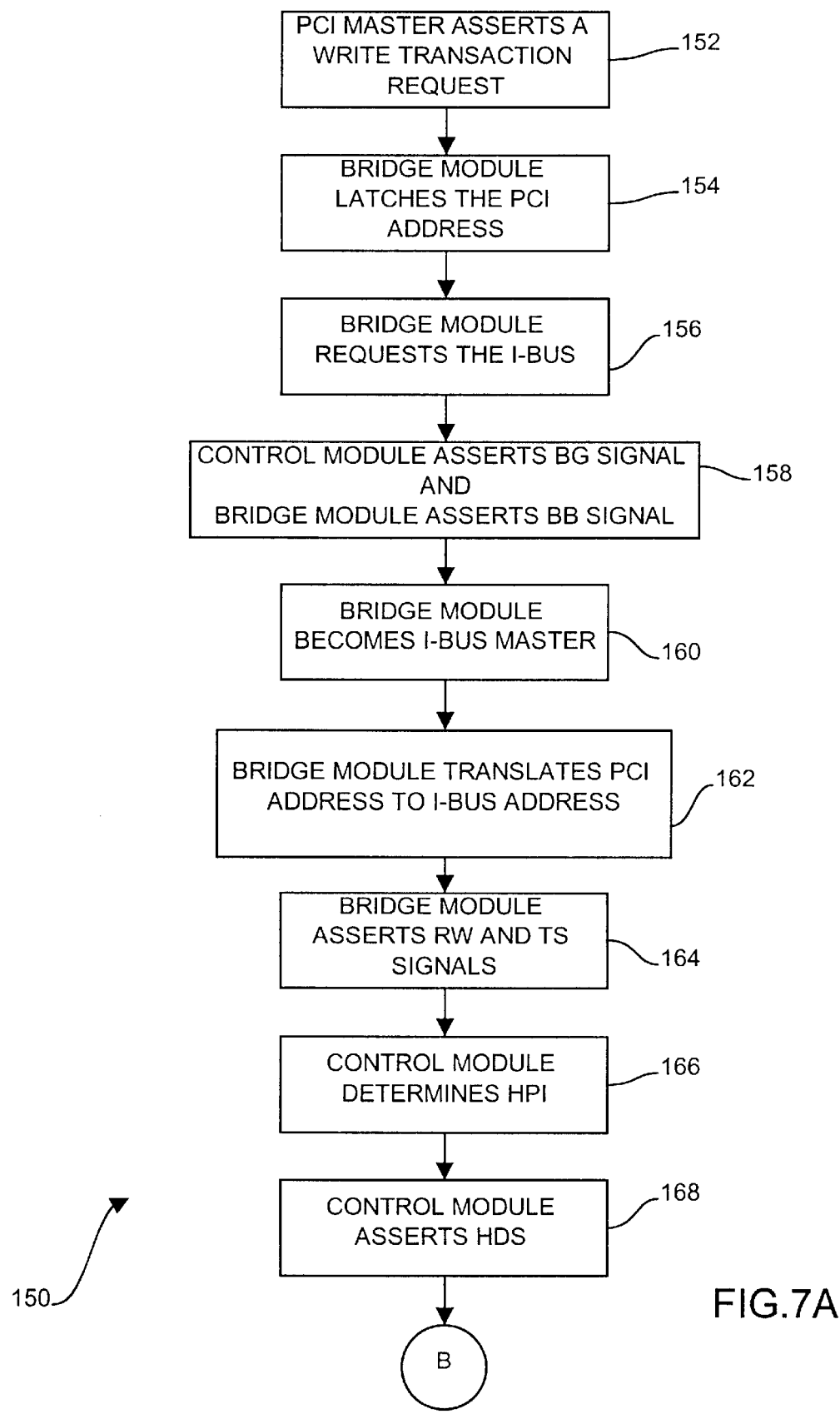
FIGS. 7A–7B illustrate a flow chart of a PCI-HPI write transaction according to the present invention.
Figure 7B:
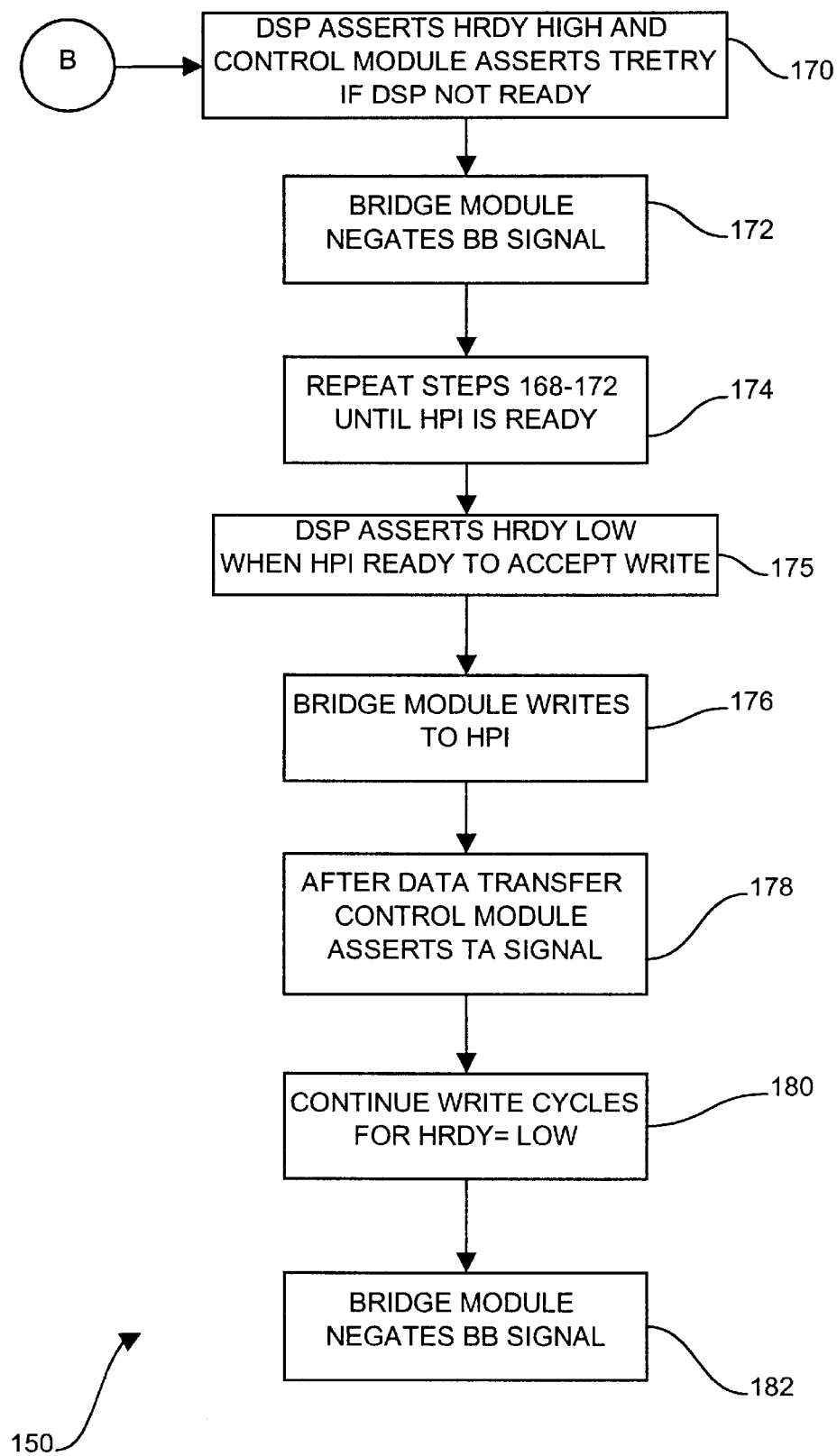

A PCI-HPI write transaction 150 is illustrated in the flow charts of FIGS. 7A–7B. The transaction 150 consists of the PCI master port 13 performing a PCI write to an HPI register in the HPI 20 of the DSP 14. The specific depiction of a PCI-HPI write transaction 150 in FIGS. 7A and 7B is exemplary and all write transactions occur in a similar manner.

The PCI master port 13, having a specific address, asserts a write transaction request on the PCI bus 12 at step 152. The bridge module 26 recognizes the address of the PCI master port 13 and latches the address of the PCI master port 13 at step 154.

The bridge module 26 requests the I-BUS 16 by asserting a bus request (BR) signal at step 156. The control module 28 asserts a bus grant (BG) signal and the bridge module 26 asserts a bus busy (BB) signal at step 158.

The bridge module 26 then becomes an I-BUS master and initiates a write on the I-BUS 16 at step 160. The bridge module 26 translates the address of the PCI master port 13 into an I-BUS address using PCI target image settings and properties stored in the PCI target module 44 of the bridge module 26 at step 162. The bridge module 26 asserts a read/write (RW) signal and a transaction start (TS) signal to the control module 28 at step 164.

The control module 28 determines, based on the I-BUS address determined at step 162, which HPI 20 the access is for and asserts an HPI chip select (HCS) signal, a register selector (HCNTRL) and a write request signal (HR_W) signal at step 168.

The control module 28 asserts an HPI data strobe (HDS) at step 168 to indicate to the DSP 14 that is an access request. If the DSP 14 is not ready to accept the write data, the DSP 14 asserts the HPI ready (HRDY) signal high to the control module 28 and the control module 28 asserts a retry (TRETRY) signal on the I-BUS 16 at step 170. The bridge module 26 then negates the bus busy (BB) signal at step 172.

The bridge module 26 and the control module 28 will repeat steps 168–172 at step 174 until the HPI 20 of the DSP 14 is ready to accept the write data. When the HPI 20 of the DSP 14 is ready to accept the write data, the DSP 14 asserts the HPI ready (HRDY) signal low at step 175.

When the bridge module 26 asserts a transaction start (TS) signal and the HRDY signal is low, the bridge module 26 writes directly to the HPI 20 of the DSP 14 at step 176. After the data transfer, the control module 28 asserts a transaction acknowledge (TA) signal at step 178 to signal to the bridge module 26 the end of the cycle. Write cycles occur at step 180 as long as the HRDY signal is low until the entirety of the write data is transferred.

When the transaction is complete, the bridge module 26 negates the BB signal to terminate the transaction at step 182.

When the PCI master port 13 retries the same transaction—qualified by the latched information—it is provided with termination signals and the transaction terminates normally on the PCI bus 12.

Timing

Details of read/write transactions between various components of the system 10/11 will be described in conjunction with the timing diagrams of FIGS. 8 to 19.

Figure 8:
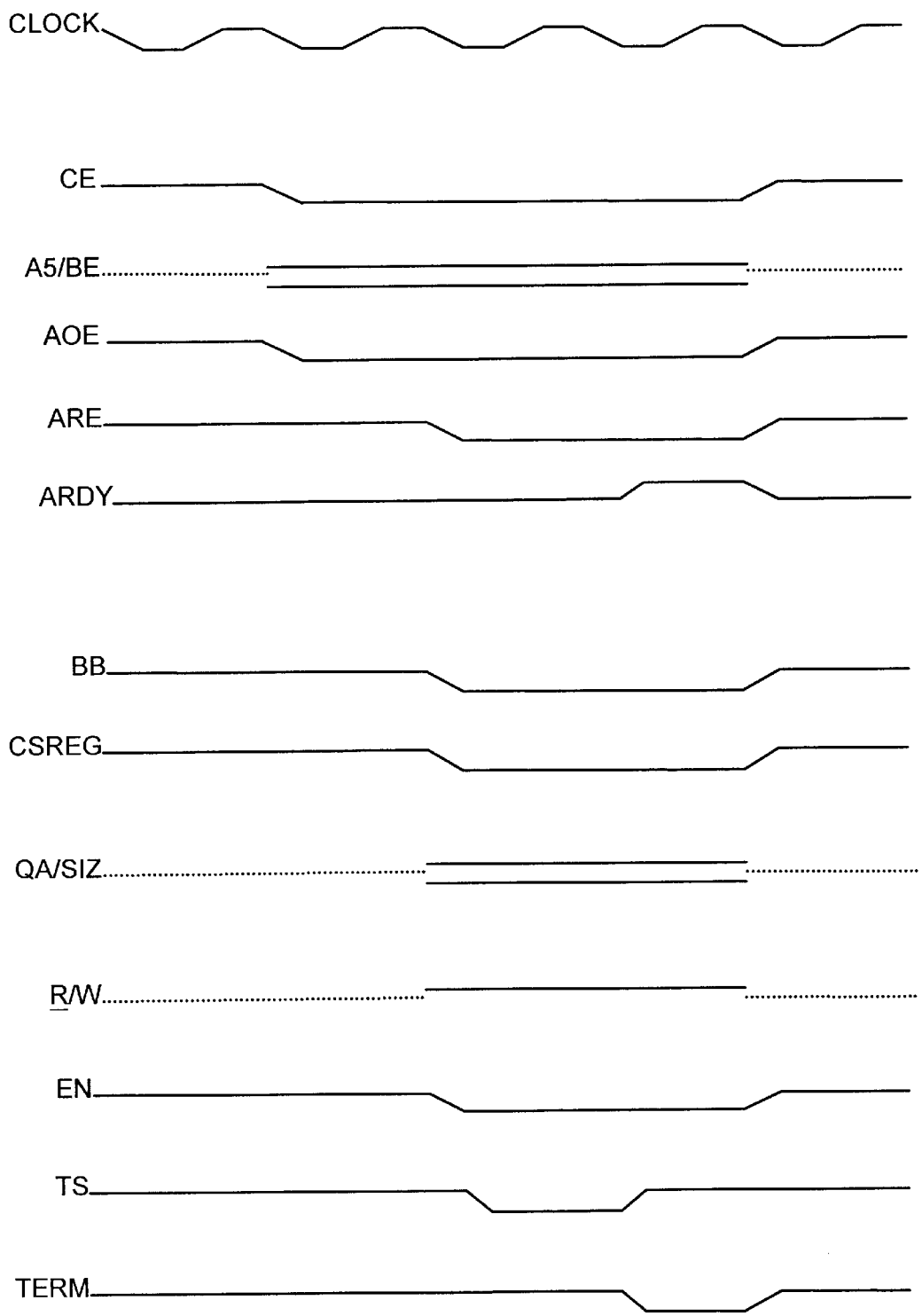
FIG. 8 illustrates a timing diagram of a bridge module read transaction according to the present invention.

A timing diagram for a read transaction of the bridge module 26 is shown in FIG. 8. During register reads the DSP(s) 14 begins by arbitrating for the I-BUS 16 as discussed above. The address generated by the DSP 14 indicates to the control module 28 that a register access is to be attempted. The decoded address causes the CSREQ signal to be asserted low.

The transceivers 22 are enabled and direction is determined by sampling the state of the AOE signal at the next positive edge of clock signal when the CE signal is detected low. The DSP 14 asserts the ARE strobe shortly after asserting AOE signal.

The control module 28 asserts the QA and SIZ signals to decode the BE signal of the DSP 14. The BE control signal may originate from the EMIF (going to the control module 28) or from the control module 28 (going to the SRAM 30). The action that the control module 28 takes on this signal depends on where it originated. If the BE signal came from the EMIF 18 then the control module 28 will decode the signal to extract information for the SIZ and QA signals. If the BE signal is originating in the control module 28 then the control module 28 will encode the BE signal with SIZ and QA information. The BE signal selects one of 4 bytes that are active on the DSP's EMIF interface 18. SIZ translates on the I-BUS 16 to a "port" size of 8/16/32 bits. QA translates to addressing of bytes on each of the possible port sizes.

The I-BUS 16 R/W signal is the inverse of the AOE signal for register accesses. The TS signal causes the bridge module 26 to produce a termination (TERM) signal.

If the termination signal is normal then an ARDY signal is asserted and the DSP 14 transaction will proceed. If the termination condition is an error then the ARDY signal is asserted along with an error interrupt (EINT) signal. If the termination condition is a retry then the control module 28 retries by asserting the TS signal until either a normal or error termination occurs.

Figure 9:
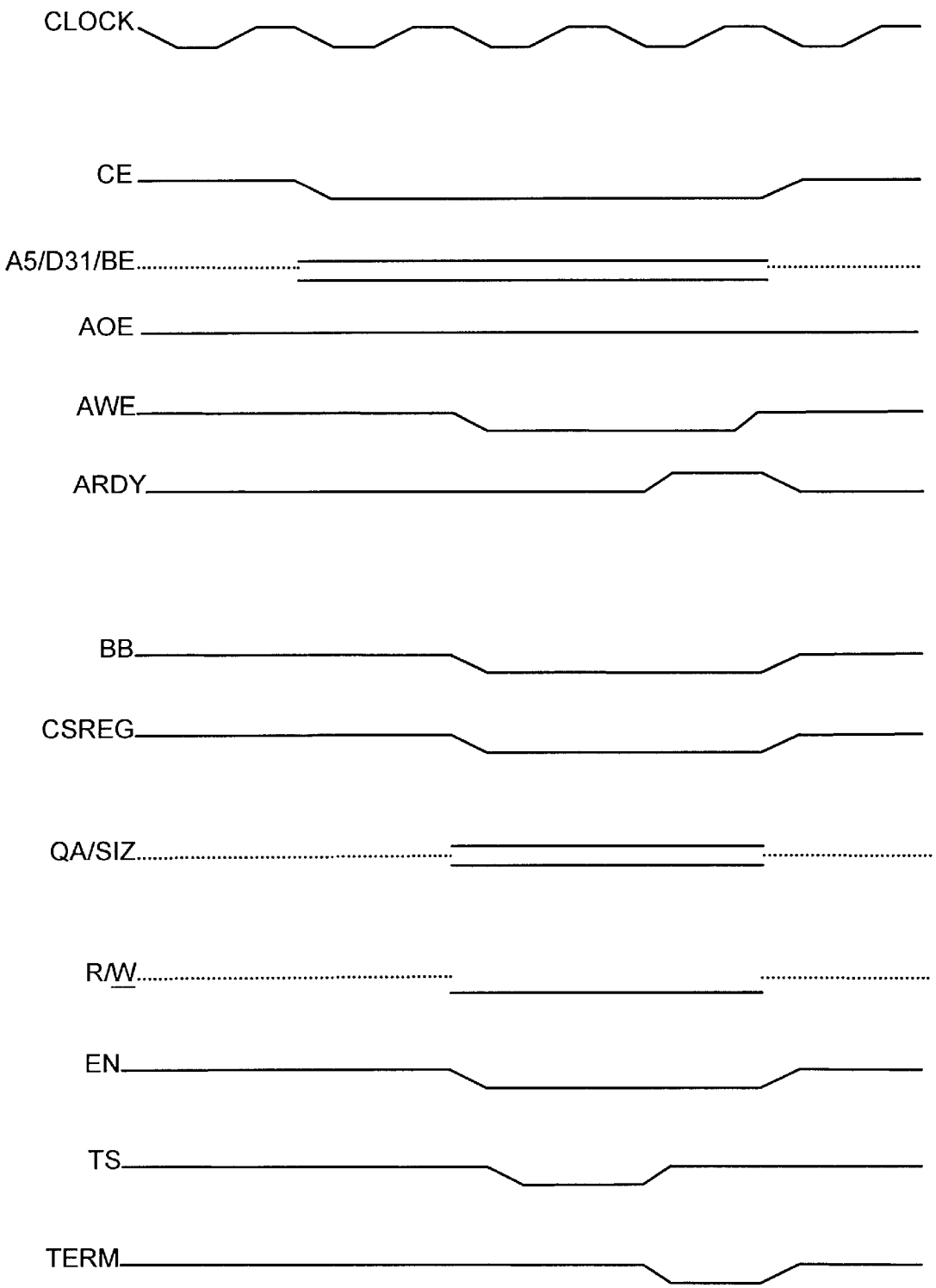
FIG. 9 illustrates a timing diagram of a bridge module write transaction according to the present invention.

A timing diagram for a write transaction of the bridge module 26 is shown in FIG. 9. During register writes the DSP(s) 14 begin by arbitrating for the I-BUS 16 as discussed above. The address generated by the DSP 14 indicates to the control module 28 that a register access is to be attempted. The decoded address causes the CSREG signal to be asserted low.

The transceivers 22 are enabled and direction is determined by sampling the state of the AOE signal at the next positive edge of clock signal when the CE signal is detected low. The DSP 14 asserts the AWE strobe shortly after asserting AOE but can encounter wait states (i.e. ARDY signal low). The AOE is asserted high throughout the entire clock cycle in FIG. 9 as a low signal indicates read and this is a write transaction.

The control module 28 asserts the QA and SIZ signals to decode the BE signal of the DSP 14. The I-BUS 16 R/W signal is the inverse of the AOE signal for register accesses. The TS signal causes the bridge module 26 to produce a termination (TERM) signal.

If the termination signal is normal then the ARDY signal is asserted and the DSP 14 transaction is complete. If the termination condition is an error then the ARDY signal is asserted along with an error interrupt (EINT) signal. If the termination condition is a retry then the control module 28 will reassert the TS signal until either a normal or error termination occurs.

Figure 10:
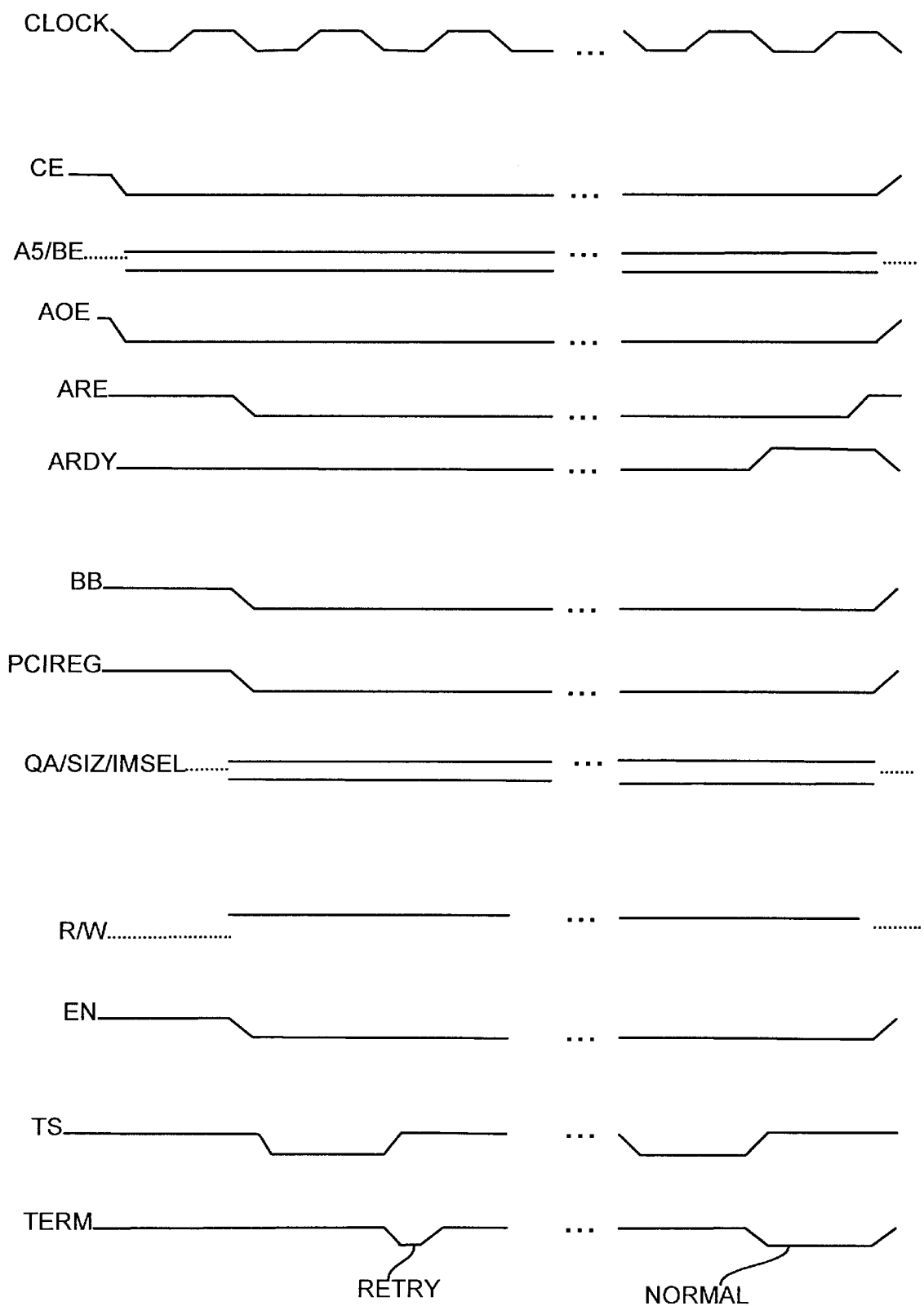
FIG. 10 illustrates a timing diagram of a single PCI read transaction according to the present invention.

A timing diagram of a single PCI read transaction is shown in FIG. 10. During single PCI reads the DSP(s) 14 begin by arbitrating for the I-BUS 16. The address generated by the DSP 14 indicates to the control module 28 that a PCI access is to be attempted. The decoded address causes the control module 28 to assert the PCIREG and IMSEL signals.

The transceivers 22 are enabled and direction is determined by sampling the state of the AOE signal at the next positive edge of clock signal when the CE signal is detected low. The DSP 14 asserts the ARE strobe shortly after asserting AOE but can encounter wait states (i.e. ARDY signal low).

The control module 28 asserts the QA and SIZ signals to decode the BE signal of the DSP 14. The I-BUS 16 R/W signal is the inverse of the AOE signal for PCI accesses. The TS signal causes the bridge module 26 to begin processing the read.

In the case of a single read, the address, data, and size are latched by the I-BUS slave module 48 of the I-BUS interface 46 of the bridge module 26. The cycle information is latched in the delayed single transfer buffer 52c of the slave channel 52 of the bridge module 26. After latching the information, the bridge module 26 retries the DSP 14 cycles until the read completes on the PCI bus 12.

When the PCI transaction completes normally, the termination (TERM) signal is normal and the asynchronous memory ready (ARDY) signal is asserted. If the termination condition is an error then the ARDY signal is asserted along with an error interrupt (EINT) signal. If the termination condition is a retry then the control module 28 will reassert the transaction start (TS) signal until either a normal or error termination occurs.

Figure 11:
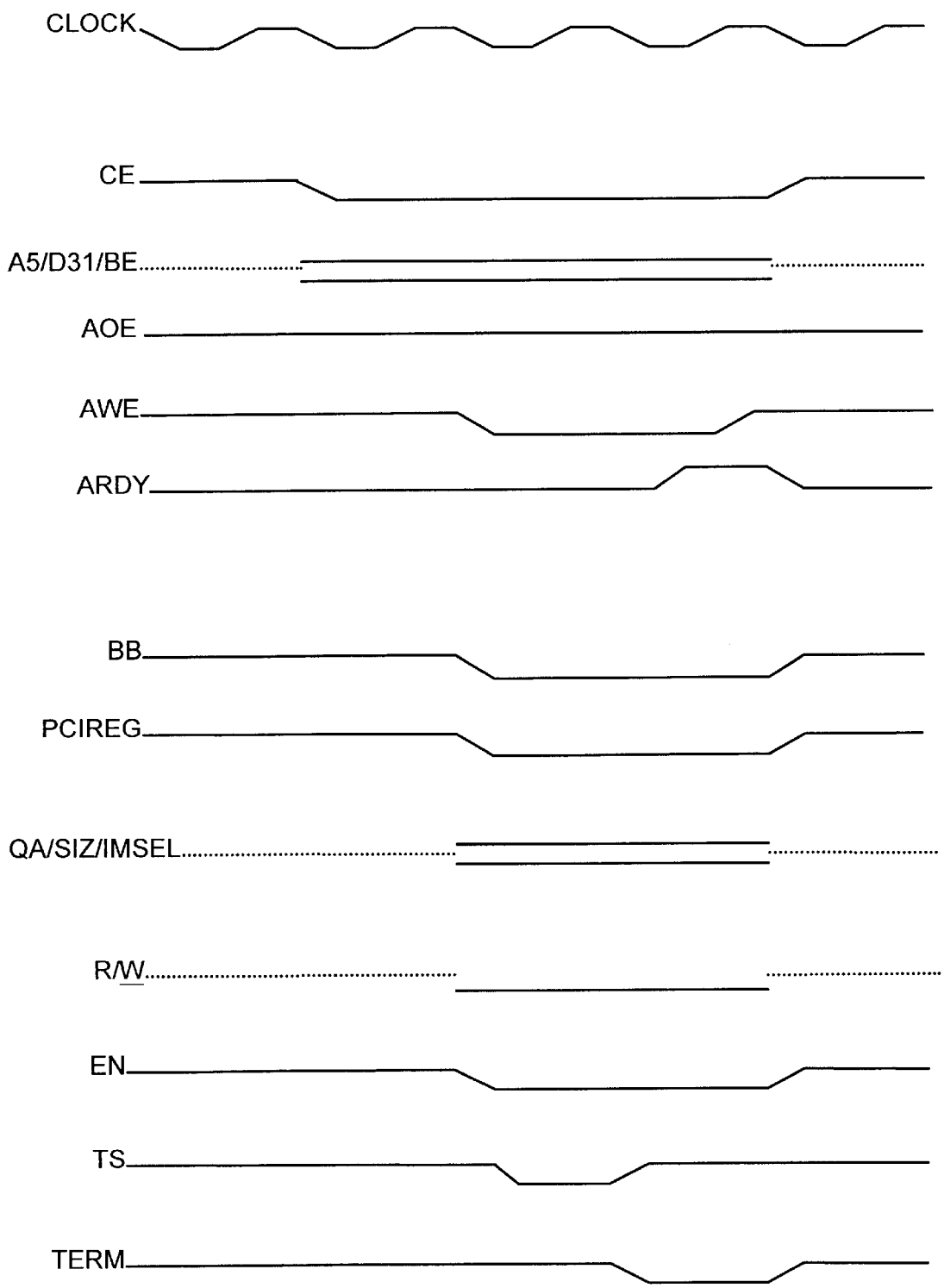
FIG. 11 illustrates a timing diagram of a single PCI write transaction according to the present invention.

A timing diagram for a single PCI write transaction is shown in FIG. 11. During single PCI writes the DSP(s) 14 begin by arbitrating for the I-BUS 16. The address generated by the DSP 14 indicates to the control module 28 that a PCI access is to be attempted. The decoded address causes the bridge module 26 to asserts the PCIREG and IMSEL signals.

The transceivers 22 are enabled and direction is determined by sampling the state of the AOE signal at the next positive edge of clock signal when the CE signal is detected low. The DSP 14 asserts the AWE strobe shortly after asserting the AOE signal but can encounter wait states (i.e. ARDY signal low). The AOE is not asserted in FIG. 11 as it is undesirable to have the DSP 14 write while the PCI master port 13 on the PCI bus 12 is writing.

The control module 28 asserts the QA and SIZ signals to decode the BE signal of the DSP 14. The I-BUS 16 R/W signal is the inverse of the AOE signal for PCI accesses. The TS signal will cause the bridge module 26 to process the write.

PCI write transactions to the bridge module 26 can go to the I-FIFO 54a or to the delayed single transfer buffer 52c/60c depending on the selected slave image.

Posted writes are considered complete when the I-FIFO 54a write is accepted. If the DSP 14 attempts to post a write transaction when the I-FIFO 54a does not have enough space, the transaction is retried.

In the case of a delayed write transaction, the address, data, and size are latched in the delayed single transfer buffer 52c/60c. After latching this information the bridge module 26 retries the DSP 14 write. When the PCI transaction completes normally, a normal cycle termination is generated. If the PCI transaction does not complete normally, then an error condition is generated as the termination.

If the termination signal is normal then the write completed signal and the ARDY signal is asserted and the DSP 14 transaction is complete. If the termination condition is an error then the ARDY signal is asserted along with an error interrupt (EINT). If the termination condition is a retry then the control module 28 will reassert the transaction start (TS) signal until either a normal or error termination occurs.

Figure 12:
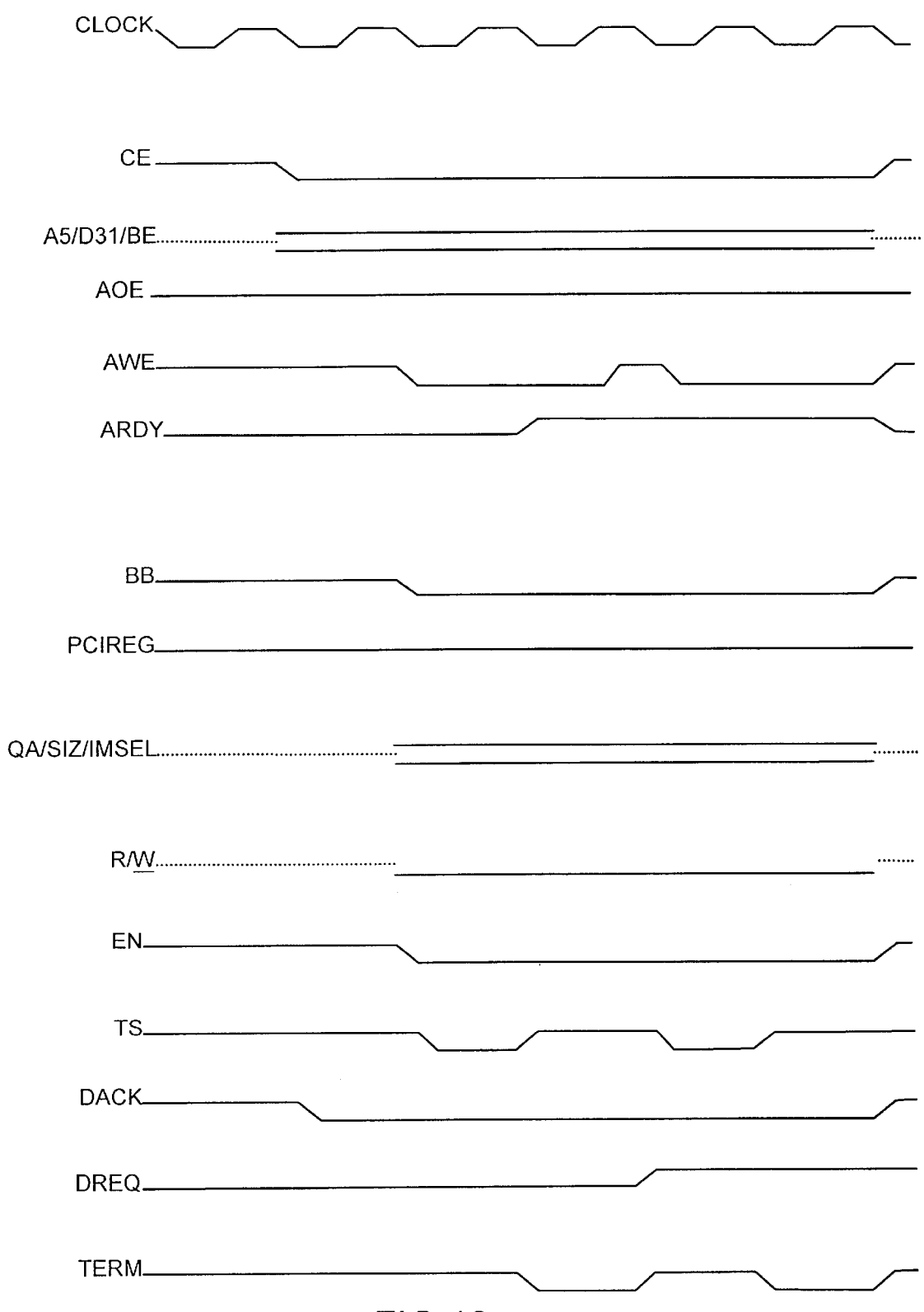
FIG. 12 illustrates a timing diagram of a DMA write transaction according to the present invention.

A timing diagram for an IDMA write transaction is shown in FIG. 12. The DSP(s) 14 engage in a direct memory access write action following arbitration for the I-BUS 16 and maintains ownership of the I-BUS 16 until the IDMA transfer is complete.

The bridge module 26 requests IDMA data (from the IDMA channel 54) by asserting the DREQ signal. The DSP 14 then begins a DMA write. The DMA access generated by the DSP 14 causes the address decoder 86 of the control module 28 to assert the DACK signal. The transceivers 22 are enabled and direction is determined by sampling the state of the AOE at the next positive edge of the clock when the CE signal is detected low. The DSP 14 asserts the AWE strobe shortly after asserting AOE. The ARDY signal is high while the DREQ is low. Both the ARDY and DREQ are low at the same time in FIG. 12 as the EMIF 18 is in a waiting state and has not started sending data and the bridge module 26 is ready to accept IDMA transactions.

The control module 28 asserts the QA and SIZ signals to decode the BE signal of the DSP 14. The I-BUS 16 R/W signal is inverse of the AOE signal for PCI accesses. The TS signal causes the bridge module 26 to process each IDMA write transaction to the bridge module 26.

Figure 13:
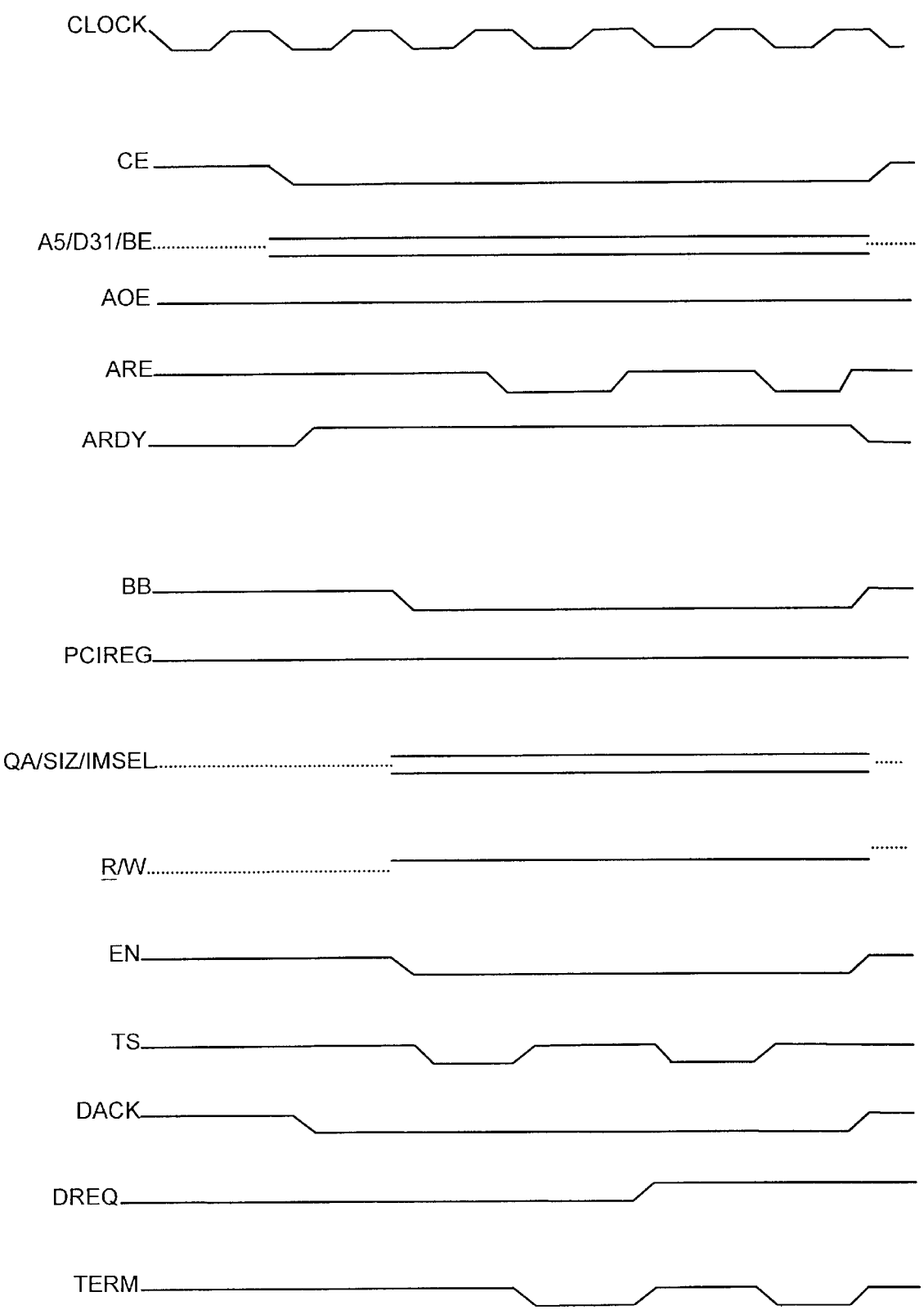
FIG. 13 illustrates a timing diagram of a DMA read transaction according to the present invention.

A timing diagram for an IDMA read transaction is shown in FIG. 13. The DSP(s) 14 engage in a direct memory access read action following arbitration for the I-BUS 16 and maintains ownership of the I-BUS 16 until the IDMA transfer is complete.

The bridge module 26 performs reads on the PCI bus 12 to fill the I-FIFO 54a. When a predefined amount of data is available in the I-FIFO 54a, the bridge module 26 asserts the DREQ signal to request IDMA service. The DSP 14 can be poll the state of the DREQ signal or rely on an interrupt to initiate I-FIFO 54a reads.

The DMA access generated by the DSP 14 in response to the DREQ signal causes the control module 28 to assert the DACK signal. The transceivers 22 are enabled and direction is determined by sampling the state of the AOE signal at the next positive edge of the clock when the CE signal is detected low. The DSP 14 asserts the ARE strobe shortly after asserting AOE but will encounter wait states (i.e. ARDY signal low).

The control module 28 asserts the QA and SIZ signals to decode the BE signal of the DSP 14. The I-BUS 16 R/W is the inverse of the AOE signal for PCI accesses. The TS signal will cause the bridge module 26 to begin processing the read. When the I-FIFO 54a has only one entry left the bridge module 26 de-asserts the DREQ signal and the control module 28 allows one more read of the DSP 14 and wait-states further read until the DREQ signal is asserted again.

Figure 14:
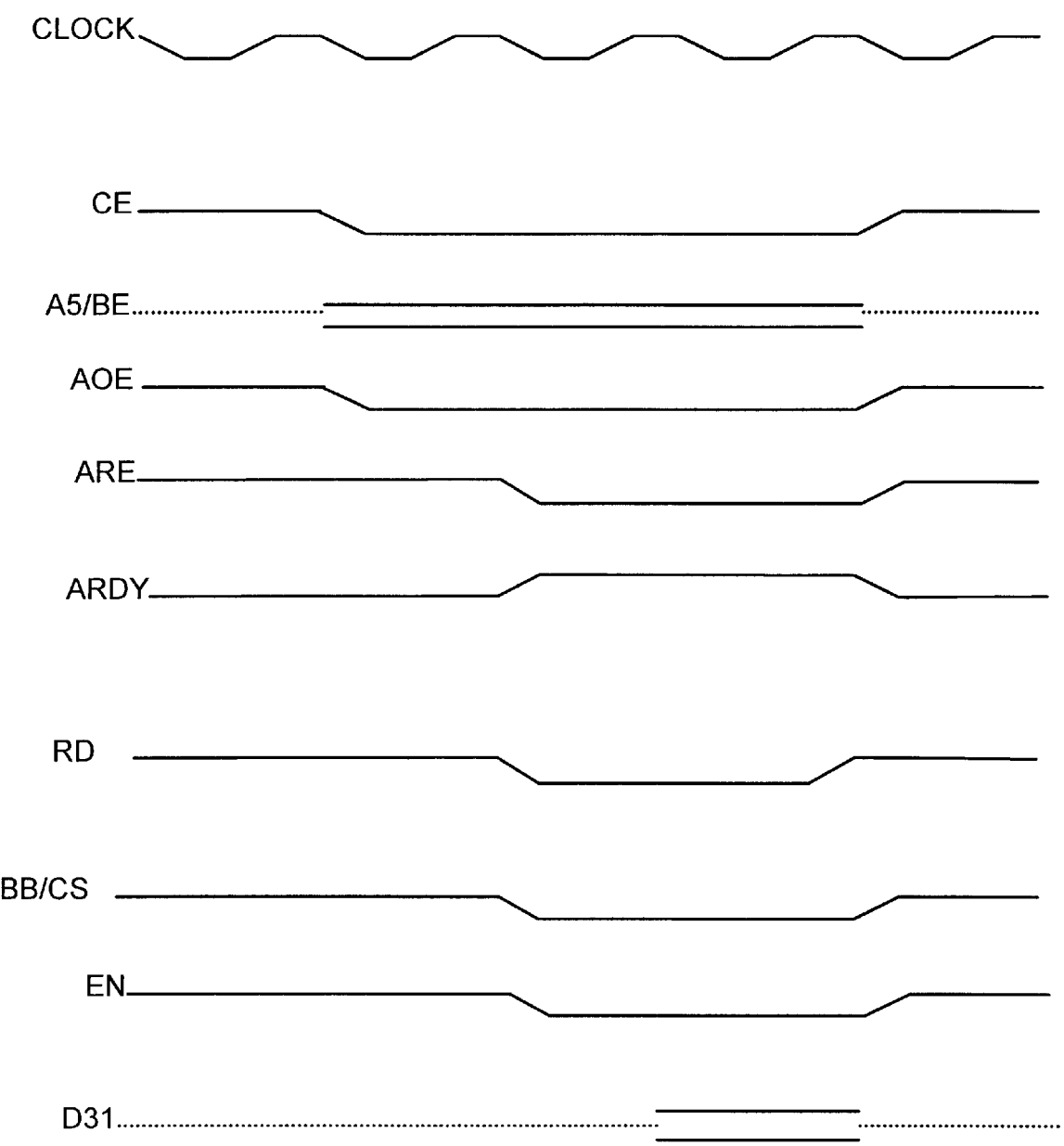
FIG. 14 illustrates a timing diagram of an SRAM read transaction according to the present invention.

A timing diagram for an SRAM 30 read transaction is shown in FIG. 14. During SRAM 30 reads the DSP 14 begins by arbitrating for the I-BUS 16. The address generated by the DSP 14 indicates to the control module 28 that an SRAM access is to be attempted. The decoded address causes the CS signal to be asserted low.

The transceivers 22 are enabled and direction is determined by sampling the state of the AOE signal at the next positive edge of the clock when the CE signal is detected low. The DSP 14 asserts the ARE strobe shortly after asserting AOE. The ARE strobe is used by the control module 28 to drive the SRAM read (RD) signal. The ARDY signal is asserted high for all SRAM accesses.

Figure 15:
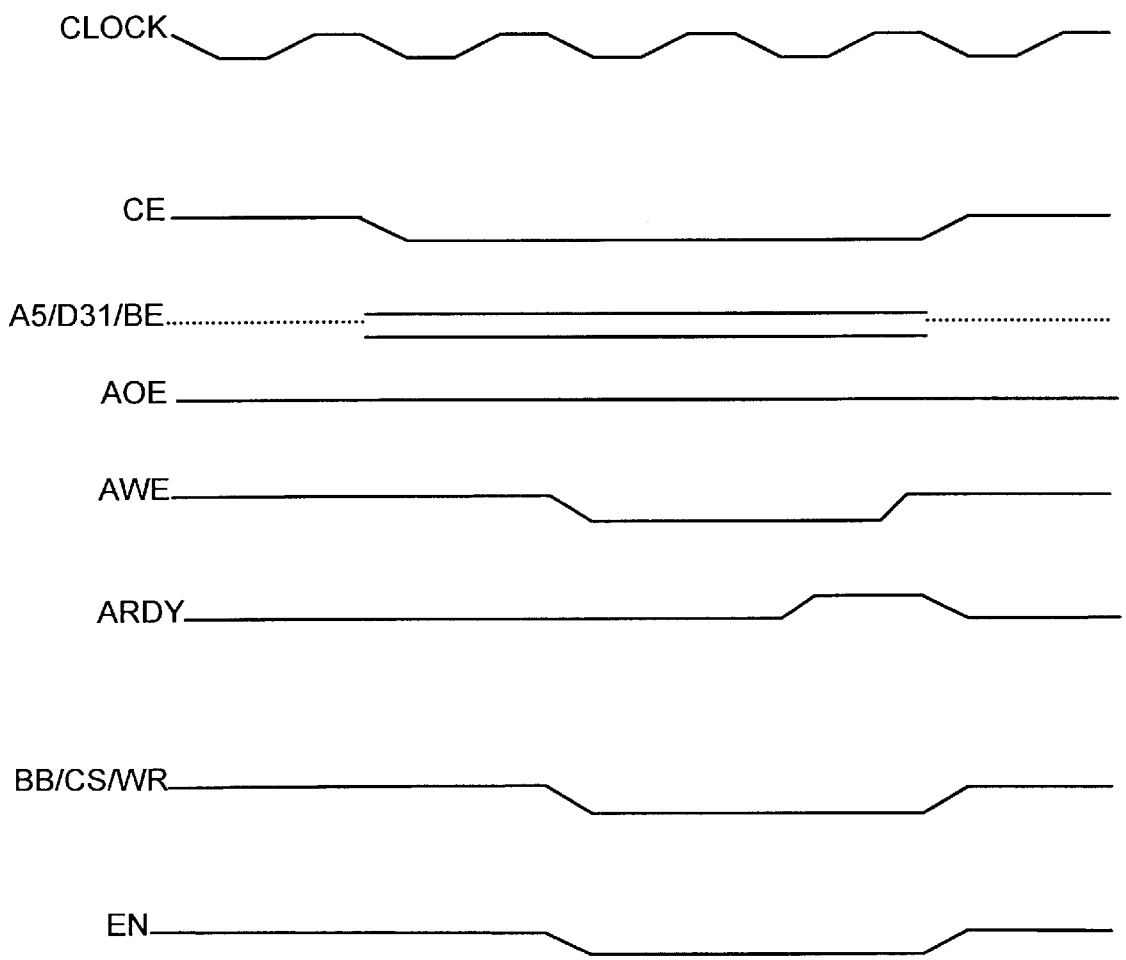
FIG. 15 illustrates a timing diagram of an SRAM write transaction according to the present invention.

A timing diagram for an SRAM 30 write transaction is shown in FIG. 15. During SRAM 30 writes the DSP 14 begins by arbitrating for the I-BUS 16. The address generated by the DSP 14 indicates to the control module 28 that an SRAM 30 access is to be attempted. The decoded address causes the CS signal to be asserted low.

The transceivers 22 are enabled and direction is determined by sampling the state of the AOE signal at the next positive edge of the clock when the CE signal is detected low. The DSP 14 asserts the AWE strobe shortly after asserting AOE. The AWE strobe is used by the control module 28 to drive the SRAM write (WR) signal. The ARDY signal is asserted high for all SRAM 30 accesses.

Figure 16:
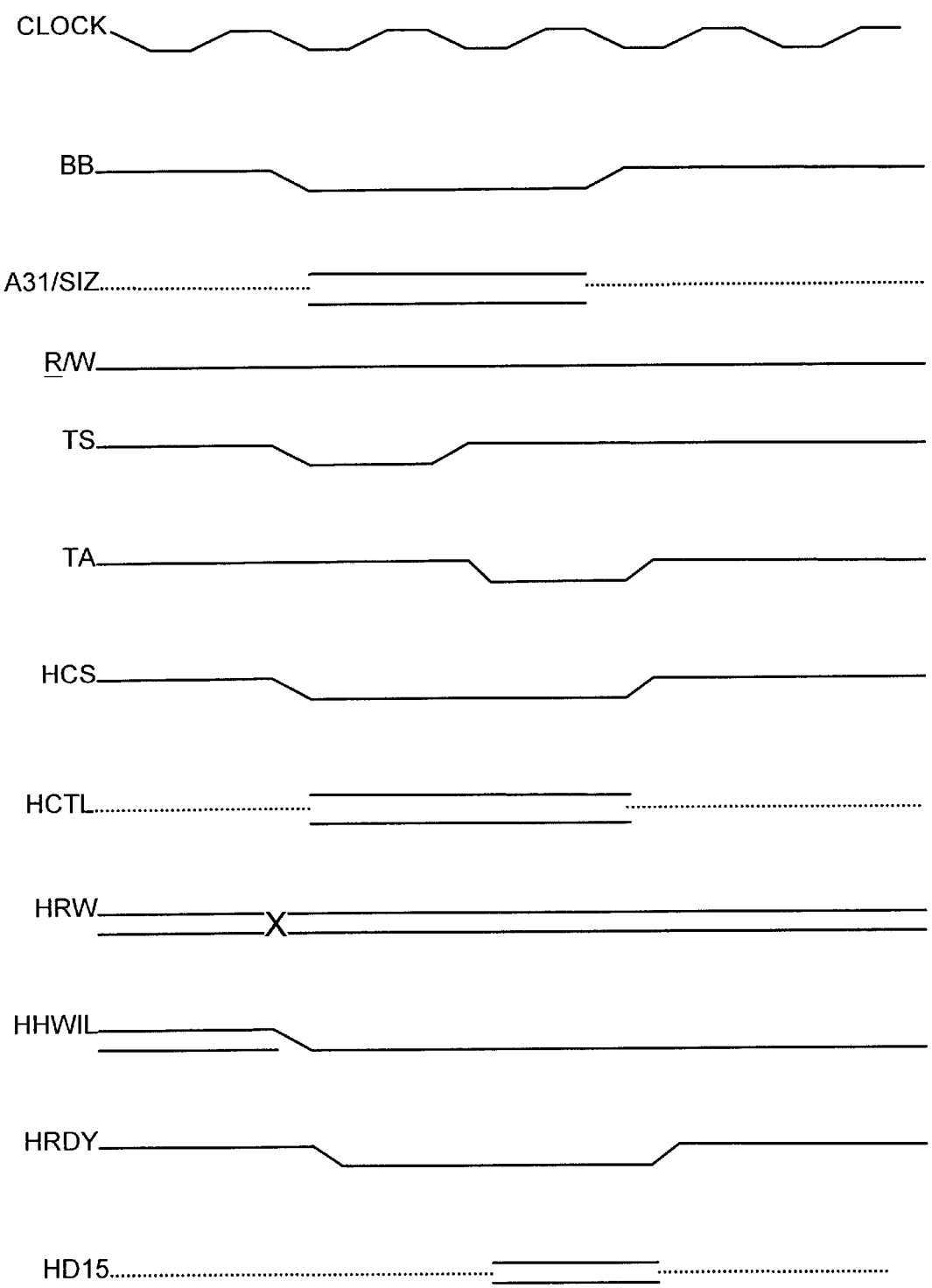
FIG. 16 illustrates a timing diagram of an HPI read transaction according to the present invention.

A timing diagram for an HPI 20 read transaction is shown in FIG. 16. All HPI 20 read transactions are processed as delayed single transfers by the bridge module 26. The bridge module 26 latches the address and byte enable information in the delayed single transfer buffer 60c of the PCI bus target channel 60, and the PCI master port 13 is retried.

The bridge module 26 arbitrates for the I-BUS 16 by asserting the BR signal to the control module 28. Once granted the I-BUS 16 (i.e. the bridge module 26 asserts the BG signal), the bridge module 26 begins a read transaction as the I-BUS master.

If the bridge module 26 does not indicate a transfer of a specified size during a HPI access then the control module 28 will generate an I-BUS error termination otherwise the control module 28 asserts the HCS, HCTL, HRW, and HHWIL signals based on the address generated by the bridge module 26. If the HPI 20 can provide the data indicated by the HRDY signal the control module 28 will terminate the I-BUS transaction with a normal termination, otherwise the control module 28 will terminate the I-BUS transaction with a I-BUS retry.

Figure 17:
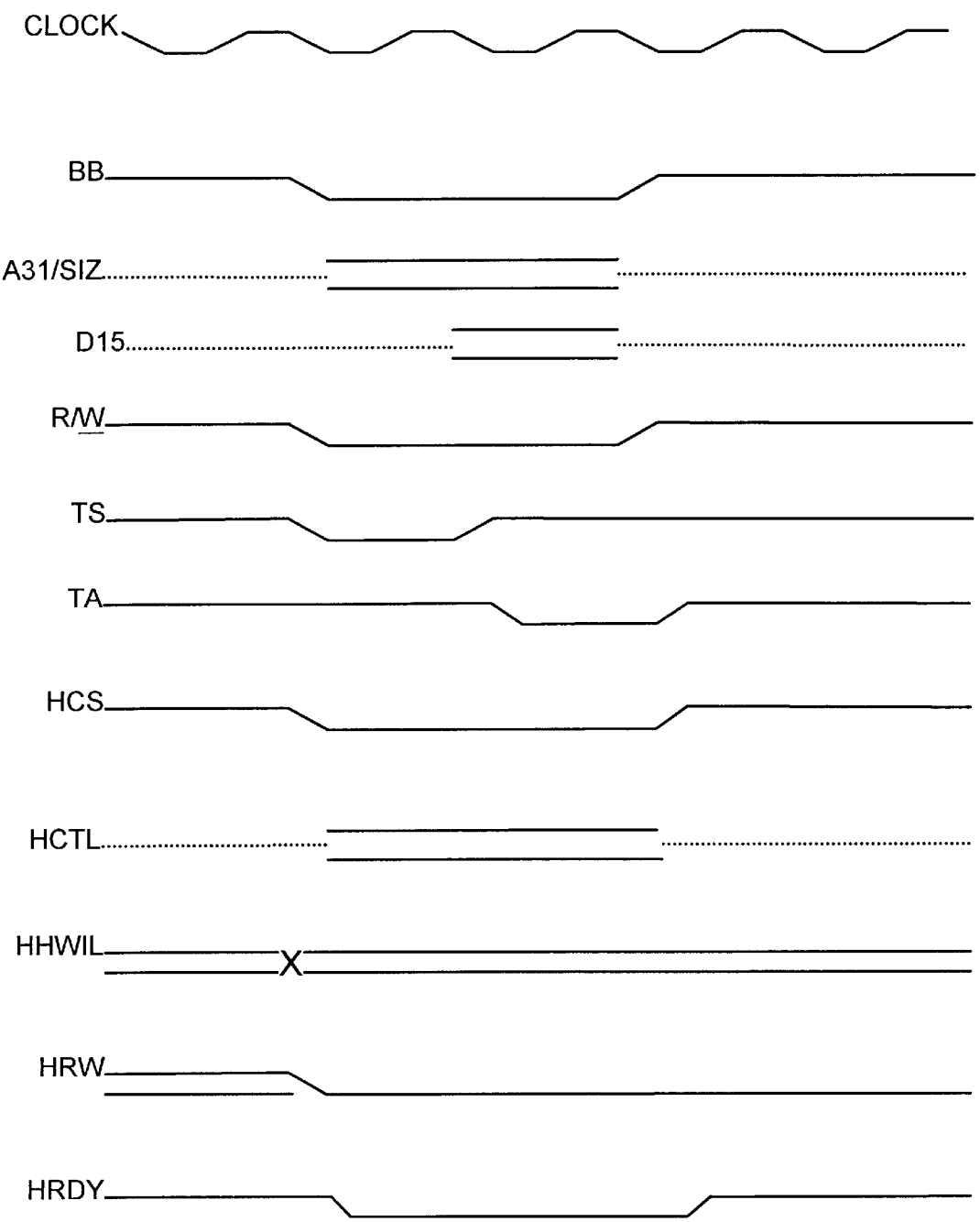
FIG. 17 illustrates a timing diagram of an HPI write transaction according to the present invention.

A timing diagram for an HPI 20 write transaction is shown in FIG. 17. PCI writes may be posted in the Px-FIFO 60a of the PCI bus target channel 60 of the bridge module 26 or processed as delayed transactions. During a delayed write transaction the PCI master port 13 is retried until the transaction completes on the HPI 20. If the transaction does not complete normally on the HPI 20, then a termination is communicated back to the PCI master port 13.

If posted writes for the HPI target image are disabled and the PCI master 13 attempts a PCI burst to the SRAM 30, then each successive data phase is processed as a delayed single write on the PCI bus 12.

The bridge module 26 arbitrates for the I-BUS 16 by asserting the BR signal. Once granted the I-BUS 16 (i.e. BG asserted), the bridge module 26 begins a write transaction as the I-BUS master.

If the bridge module 26 does not indicate a transfer of a specified size during a HPI access then the control module 28 will generate an I-BUS error termination otherwise the control module 28 asserts the HCS, HCTL, HRW, and HHWIL signals based on the address generated by the bridge module 26. If the HPI 20 can accept the data indicated by the HRDY signal, then the control module 28 will terminate the I-BUS transaction with a normal termination, otherwise the control module 28 will terminate the I-BUS transaction with an I-BUS retry.

Figure 18:
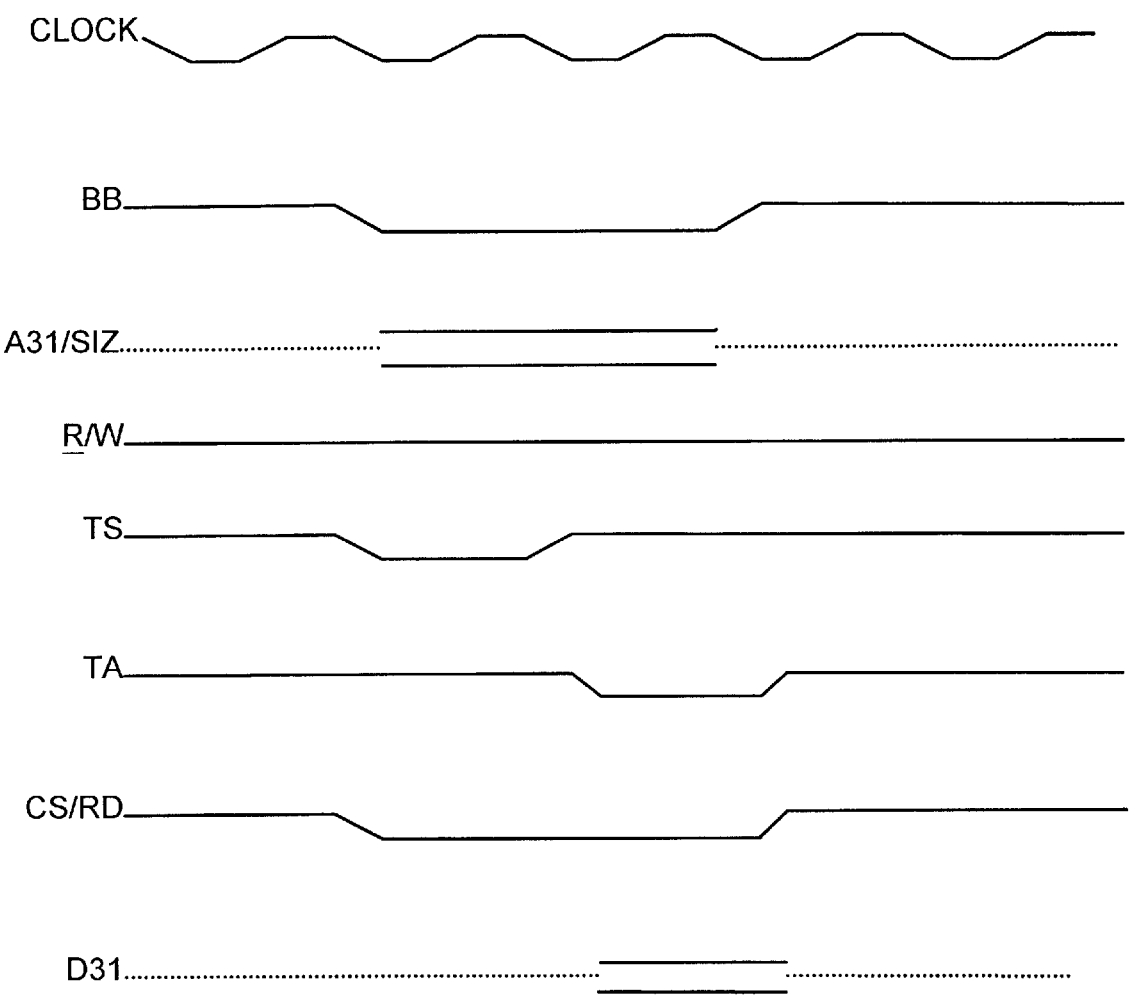
FIG. 18 illustrates a timing diagram of an SRAM read transaction according to the present invention.

A timing diagram for an SRAM 30 read from the PCI bus 12 is shown in FIG. 18. SRAM 30 read transactions can be processed as delayed single transfers or pre-fetched reads by bridge module 26.

The bridge module 26 arbitrates for the I-BUS 16 by asserting the BR signal. Once the I-BUS 16 is granted (i.e. BG signal asserted), the bridge module 26 begins a read transaction as the I-BUS master.

If the bridge module 26 does not indicate a transfer of a specified size during a SRAM access then the control module 28 will generate an I-BUS error termination otherwise the control module 28 asserts the CS signal based on the address generated by the bridge module 26, and provides the RD strobe and normal termination using the TA signal.

Figure 19:
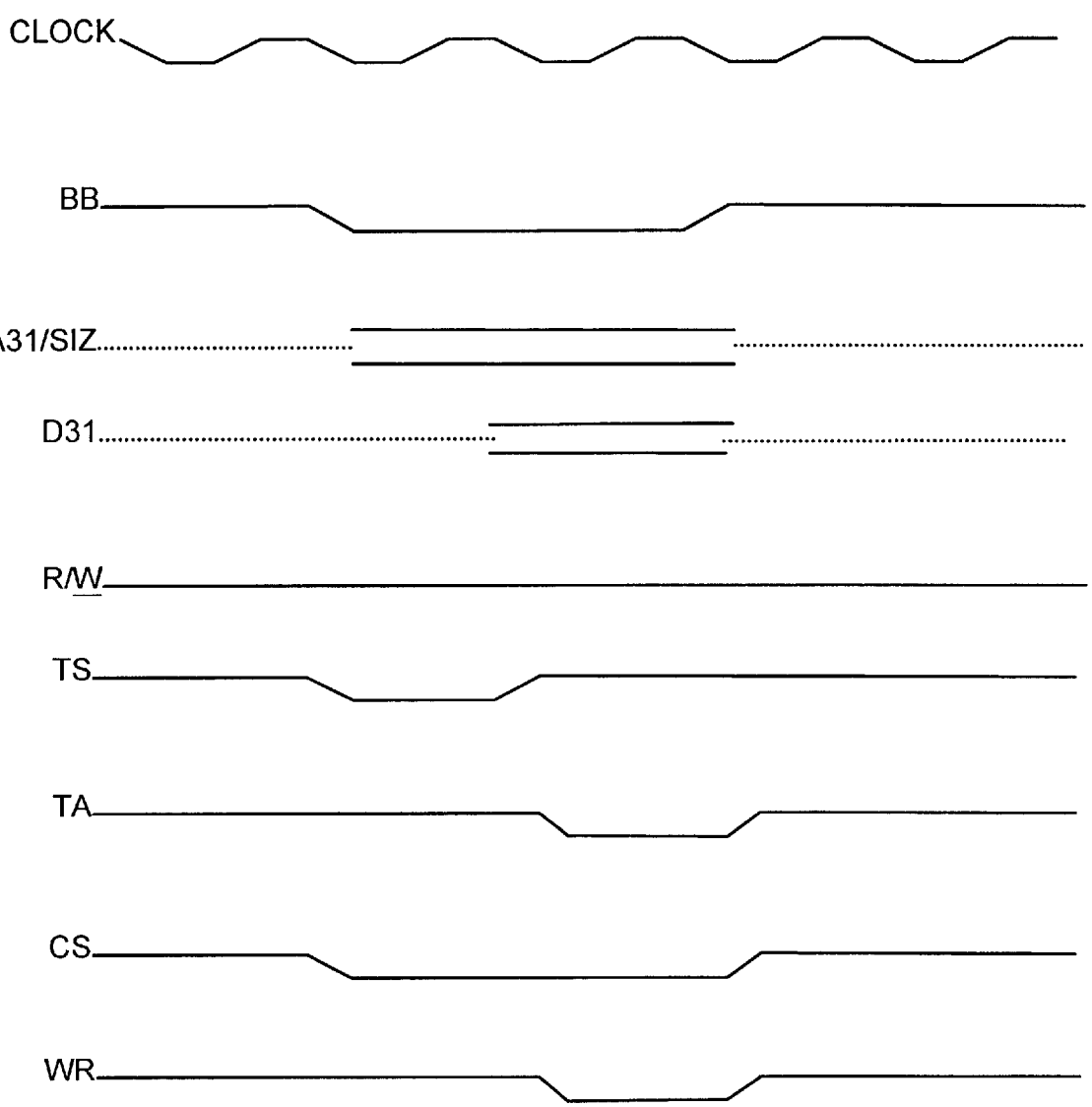
FIG. 19 illustrates a timing diagram of an SRAM write transaction according to the present invention.

A timing diagram for an SRAM 30 write to the PCI bus 12 is shown in FIG. 19. PCI writes can be posted in the Px-FIFO 60a of the PCI bus target channel 60 of the bridge module 26 or processed as delayed transactions. During a delayed write transaction the PCI master port 13 is retried until the transaction completes. If the transaction does not complete normally then the appropriate termination is communicated back to the PCI master port 13. If posted writes for the target image are disabled and the PCI master port 13 attempts to PCI burst to the SRAM 30, then each successive data phase is processed as a delayed single write on the PCI bus 12.

TABLE A1

| SIGNAL | INPUT/ OUTPUT | DESCRIPTION |
|---|---|---|
| | | EMIF 18 SIGNALS |
| AOE | I | asynchronous memory output enable input DSP 14 asserts this signal low to control module to indicate a read transaction |
| ARE | I | asynchronous memory read strobe DSP 14 asserts this signal low to control module 28 to begin a read transaction and latches data on the positive edge of ARE signal |
| AWE | I | asynchronous memory write strobe DSP 14 asserts this signal low to control module 28 to signify write data is valid for the duration of the strobe |
| ARDY | O | asynchronous memory ready signal DSP 14 asserts logic low to cause the asynchronous interface to be wait stated control module 28 asserts logic high to indicate transaction can resume |
| BE | I–O | byte enable is sampled by control module 28 during EMIF 18 transactions and translated to proper I-BUS 16 byte enables during SRAM 30 access, control module 28 drives byte enable accordingly |
| CE | I | chip enable DSP 14 asserts chip enable to control module 28 in order to indicate that the processor is ready to perform a read or write transaction the DSP 14 is wait stated until the control module 28 arbitration module 84 allows the transaction to proceed |
| EINT | O | error interrupt indicates bus error on I-BUS 16 or accesses made to invalid memory areas by the DSP 14 |
| | | HPI 20 SIGNALS |
| HCNTL | O | HPI control selects the host port register to be accessed by the PCI master 13 |
| HCS | O | HPI chip select selects which processor port will be accessed by the PCI master 13 |
| HRST | O | HPI reset is asserted by the control module 28 to reset individual DSPs 14 |
| HDS | O | HPI data strobe is asserted low by control module 28 to start an HPI transaction and deasserted at the point of completion |
| HHWIL/ HBIL | O | HPI half-word select first or second half-word (not necessarily high or low order) OR HPI half-byte select first or second half-byte (not necessarily high or low order) |
| HR_W | O | HPI read or write select is asserted low for writes and high for reads |
| HRDY | I | HPI ready is sampled by control module 28 to determine the status of the host ports 20 for a read or write transaction if indicated high, control module 28/bridge module 26 will be retried |
| | | SHARED MEMORY 30 CONTROL SIGNALS |
| CS | O | shared SRAM chip select control module 28 asserts CS low to select SRAM for a read or write transaction |
| RD | O | shared SRAM read strobe control module 28 asserts RD to enable a read from the SRAM 30 data is latched by the bridge module 26 or the DSP 14 before the positive edge of RD |
| WR | O | shared SRAM write strobe control module 28 asserts WR to write to the |

TABLE A1-continued

| SIGNAL | INPUT/OUTPUT | DESCRIPTION |
|---|---|---|
| BE | I–O | SRAM 30 data is sampled by the bridge module 26 or the DSP 14 before the positive edge of WR byte enable is asserted by the control module 28 during target channel accesses during DSP 14 transactions the EMIF 18 will assert BE |
| | | DSP 14 ARBITRATION SIGNALS |
| EN | O | enable signal the control module 28 arbitration module 84 selects one of the transceivers 22 (in a multiple DSP 14 environment) asserting their corresponding CE signals upon selection of the DSP 14, control module 28 asserts the EN signal to allow the processor to perform transactions on the I-BUS 16 |
| DIR | O | indicates the direction of the transaction for the EMIF 18 |
| LOCKEN | I | lock enable enables lock arbitration |
| LOCKR | I | lock registers DSP 14 asserts the LOCKR pin to request access to bridge module 26 registers or the IDMA channel 54 and keeps signal asserted while continuing to use those resources lock arbitration is enabled to use this signal |
| LOCKG | O | lock grant asserted by the control module 28 to acknowledge that the requesting processor has been granted the bridge module 26 lock grant is deasserted if the LOCKR is deasserted. |
| | | I-BUS SIGNALS |
| A | I | address bus address decode signals are examined by the control module 28 to determine which device on the I-BUS 16 is being accessed |
| BB | Rescinding Tristate I–O | bus busy indicates ownership of the I-BUS 16 BB, along with BR and BG, provides a three-wire handshake for I-BUS 16 arbitration |
| BG | O | BUS grant indicates that the bridge module 26 may become the next owner of the I-BUS 16 |
| BR | I | bus request used by the bridge module 26 to request ownership of the I-BUS 16. |
| CSPCI | O | PCI chip select indicates that the current transaction on the I-BUS 16 is an access to the PCI Bus 12 (via the bridge module 26) |
| CSREG | O | register chip select indicates that the current transaction on the I-BUS 16 is an access to registers of the bridge module 26 |
| DACK | O | IDMA acknowledge the control module 28 asserts the DACK signal to indicate that the current transaction is an IDMA transaction |
| DREQ | I | IDMA request the bridge module 26 asserts the DREQ signal to the control module 28 to indicate that it is ready to accept IDMA transactions |
| IMSEL | O | image select the control module 28 asserts signal to select which I-BUS 16 slave images are selected for PCI master transaction |
| QA | Tristate I–O | I-BUS 16 address A1 and A0 signals on the I-BUS 16 driven or sampled on the I-BUS 16 along with SIZ, to determine active byte lanes on the I-BUS 16 |
| CLOCK | I | I-BUS 16 clock all transactions on the I-BUS 16 are synchronized to this clock |
| R/W | Tristate I–O | read/write driven or sampled by the control module 28 to indicate the direction of the data transfer on the I-BUS 16 a logic high indicates a read transaction, a logic low a write |
| SIZ | Tristate I–O | size driven or sampled by the control module 28 to indicate the number of bytes to be transferred during an I-BUS 16 cycle |
| TA | Tristate I–O | transaction acknowledge driven by the control module 28 to acknowledge the completion of data transfer on the I-BUS 16 sampled by the control module 28 when asserted by the bridge module 26 |
| TEA | Tristate I–O | transfer error acknowledge indicates an I-BUS 16 error in an I-BUS 16 transaction performed by the bride module 26 or the DSP 14 e.g.: accessing invalid memory space by the PCI master 13. |
| TRETRY | Tristate I–O | retry driven by the control module 28 or the bridge module 26 to generate retries on the I-BUS 16 |
| TS | Tristate I–O | transaction/transfer start used to indicate the beginning of an I-BUS 16 cycle by the control module 28 or the bridge module 26 indicates that the following signals will be valid on the next rising edge of the clock: QA, SIZ, and R/W. |

What is claimed is:

1. An apparatus for bridging communications between a first communication endpoint equipped with a two port digital signal processor (DSP) circuit having a DSP master port and a DSP slave port and a second communication endpoint equipped with a peripheral component interconnect (PCI) bus module having a PCI master port and a PCI memory connected to a PCI bus, said apparatus comprising;
   an intermediate bus operably connected to the DSP master port and the DSP slave port; and
   regulating means connecting the PCI bus module to the intermediate bus for regulating access to the intermediate bus and data transfer between the first and second communication endpoints.

2. The bridge apparatus according to claim 1, wherein the regulating means includes an arbitration means for controlling which of the first and second communication endpoints is given control of the intermediate bus for data transfer.

3. The bridge apparatus according to claim 2, wherein the arbitration means includes an intermediate bus arbiter for permitting the DSP master port to continue to transfer data from the DSP circuit to the PCI bus module when the PCI bus master port is asserted.

4. The bridge apparatus according to claim 3, wherein a plurality of two port DSP circuits are connected to the intermediate bus and the arbitration means includes a DSP arbiter for arbitrating read and write access to the intermediate bus between the plurality of DSP circuits.

5. The bridge apparatus according to claim 4, wherein the intermediate bus enables communication between the plurality of DSP circuits.

6. The bridge apparatus according to claim 3, further comprising an intermediate bus master for controlling the intermediate bus wherein identity of the intermediate bus master is dependent on which communication endpoint initiates a transaction.

7. The bridge apparatus according to claim 6, wherein an active DSP master port is the initiator of a transaction and the intermediate bus master is the active DSP master port.

8. The bridge apparatus according to claim 6, wherein the intermediate bus master is the regulating means for PCI bus module initiated transactions.

9. The bridge apparatus according to claim 4, further comprising a memory storage device connected to the intermediate bus for storing requested data during a transaction.

10. The bridge apparatus according to claim 1, further comprising an isolator circuit connecting the DSP master port to the intermediate bus.

11. The bridge apparatus according to claim 4, wherein a separate isolator circuit connects the DSP master port of each of the plurality of two port DSP circuits to the intermediate bus.

12. The bridge apparatus according to claim 10, wherein the regulating means sends signals to the isolator circuit for controlling data flow therethrough.

13. A bridge system for bridging a digital signal processor (DSP) circuit having a DSP master port and a DSP slave port with a peripheral component interconnect (PCI) bus module having a PCI master port and a PCI memory connected to a PCI bus, said system comprising:
(a) an intermediate bus operably connected to the DSP master port and the DSP slave port;
(b) a bridge module coupled between the PCI bus module and the intermediate bus, the bridge module having a PCI interface and an intermediate bus interface and at least one channel coupled between the PCI interface and the intermediate bus interface for controlling communication between the intermediate bus interface and the PCI interface; and
(c) a control module coupled between the bridge module and the DSP circuit, said control module having an intermediate bus control circuit and a DSP control circuit having a slave port controller coupled to the slave port of the DSP circuit and a master port controller coupled to the master port of the DSP circuit, whereby access to the intermediate bus and data transfer between the DSP circuit and the PCI bus module are regulated.

14. The bridge system according to claim 13, wherein the control module includes an arbitration unit whereby access to the intermediate bus by the PCI bus module and the DSP circuit is determined.

15. The bridge system according to claim 14, wherein the arbitration unit includes an intermediate bus arbiter for permitting the DSP master port to continue to transfer data from the DSP circuit to the PCI bus module when the PCI bus master circuit is asserted.

16. The bridge system according to claim 15, wherein a plurality of DSP circuits each having a master port and a slave port are connected to the intermediate bus and the arbitration unit further includes a DSP arbiter for arbitrating read and write access to the intermediate bus between the plurality of DSP circuits.

17. The bridge system according to claim 16, wherein the intermediate bus enables communication between multiple DSP circuits.

18. The bridge system according to claim 15, further including an intermediate bus master for controlling the intermediate bus wherein the identity of the intermediate bus master is dependent on an initiator of a transaction.

19. The bridge system according to claim 18, wherein the initiator of the transaction is the DSP circuit and the intermediate bus master is the DSP master port.

20. The bridge system according to claim 18, wherein the initiator of the transaction is the PCI bus module and the intermediate bus master is the bridge module.

21. The bridge system according to claim 13, further including an isolator circuit for separating the DSP master port from the intermediate bus.

22. The bridge system according to claim 16, wherein a separate isolator circuit connects each DSP master port to the intermediate bus.

23. The bridge system according to claim 21, wherein the isolator circuit is further connected to the control module to receive control signals from the control module to open a connection between the DSP circuit and the intermediate bus.

24. The bridge system according to claim 13, further including an external DSP memory device connected to the DSP circuit.

25. The bridge system according to claim 16, wherein each DSP circuit has a separate external DSP memory device.

26. The bridge system according to claim 25, wherein multiple DSP circuits share the same external DSP memory device.

27. The bridge system according to claim 13, further including an intermediate bus memory device for storing requested data during a transaction.

28. The bridge system according to claim 13, wherein the control module sends signals to the bridge module to control PCI bus module access to the intermediate bus.

29. The bridge system according to claim 27, wherein the DSP control circuit of the control module further includes a memory device controller for controlling access to the memory device.

30. The bridge system according to claim 13, wherein each of the at least one channels in the bridge module has a different function and the at least one channel includes:
a PCI bus channel for intermediate bus mediated PCI bus module read and write access of the DSP slave port; and
an intermediate bus channel for intermediate bus mediated DSP circuit read and write access of the PCI memory.

31. The bridge system according to claim 30, wherein the at least one channel further includes:
a direct memory access channel for high speed intermediate bus mediated DSP circuit read and write access of the PCI memory.

32. A method of carrying out a read transaction over a communications bridge between one communication endpoint equipped with a digital signal processor (DSP) circuit having a DSP master port and a DSP slave port and another communication endpoint equipped with a peripheral component interconnect (PCI) module having a PCI master port and a PCI slave port, an intermediate bus being operably connected to the DSP master port, the DSP slave port, the PCI master port, and the PCI slave port, said read method comprising:
regulating access to the intermediate bus for data transfer between a requesting master port and a requested slave port; and
transacting data for reading by the requesting master port from the requested slave port.

33. The read method according to claim 32, wherein the regulating step includes:
requesting for the requesting master port access to the intermediate bus connecting the two communication endpoints;

granting the requesting master port control of the intermediate bus if the intermediate bus is not in use; and making the master of the intermediate bus a bridging circuit connecting the requesting master port to the intermediate bus.

34. The read method according to claim 32, wherein the transacting step includes:

initiating at the intermediate bus master a read on the intermediate bus;

determining where to direct the read request data to and sending a read request signal to the requested slave port;

sending a data ready signal when the requested slave port has the requested data;

receiving at the intermediate bus master a signal indicating the requested data is ready;

reading at the intermediate bus master the requested data directly from the requested slave port; and sending from the requesting master port an end transaction signal to the intermediate bus master to disconnect when the data has been read.

35. The read method according to claim 33, further including the steps of:

receiving at a control means all requests for access to the intermediate bus; and denying any request for control of the intermediate bus if there is a transaction already taking place until the requesting master port terminates the current connection.

36. The read method according to claim 33, wherein the requesting master port and the intermediate bus master are the DSP master port and the requested slave port is the PCI slave port.

37. The read method according to claim 33, wherein the requesting master port is the PCI master port, the requested slave port is the DSP slave port, and the intermediate bus master is the bridging circuit.

38. The read method according to claim 33, wherein there is at least one additional DSP circuit coupled to the intermediate bus and an arbitration means further decides which one of the DSP circuits gets control of the intermediate bus.

39. A method of carrying out a write transaction over a communications between one communication endpoint equipped with a digital signal processor (DSP) circuit having a DSP master port and a DSP slave port and another communication endpoint equipped with a peripheral component interconnect (PCI) module having a PCI master port and a PCI slave port, an intermediate bus being operably connected to the DSP master port, the DSP slave port, the PCI master port, and the PCI slave port, said write method comprising:

regulating access to the intermediate bus for data transfer between a requesting master port and a requested slave port; and transacting data for writing from the requested master port to the requested slave port.

40. The write method according to claim 39, wherein the regulating step includes:

requesting for the requesting master port access to an intermediate bus connecting the two communication endpoints;

granting the requesting master port access to the intermediate bus if the intermediate bus is not in use; and making the master of the intermediate bus a bridging circuit connecting the requesting bus to the intermediate bus.

41. The write method according to claim 39, wherein the transacting step includes:

initiating at the intermediate bus master a write transaction on the intermediate bus;

determining where to direct the write request data to and sending a write request signal to the requested slave port;

sending a data accept signal when the requested slave port is ready to start accepting data;

receiving at the intermediate bus master a signal indicating the requested slave port is ready to receive data and sending data directly to the requested slave; and sending from a requesting master port an end transaction signal to the intermediate bus master to disconnect when the data sending is finished.

42. The write method according to claim 40, further including the steps of:

receiving at a control means all requests for access to the intermediate bus; and denying any request for control of the intermediate bus if there is a transaction already taking place until the requesting master port terminates the current connection.

43. The write method according to claim 40, wherein the requesting master port and the intermediate bus master are the DSP master port and the requested slave port is the PCI slave port.

44. The write method according to claim 40, wherein the requesting master port is the PCI master port, the requested slave port is the DSP slave port, and the intermediate bus master is the bridging circuit.

45. The write method according to claim 39 wherein, there is at least one additional DSP circuit coupled to the intermediate bus and an arbitration means further decides which one of the DSP circuit gets control of the intermediate bus.

* * * * *